United States Patent [19]

Hamano et al.

[11] 4,220,991
[45] Sep. 2, 1980

[54] ELECTRONIC CASH REGISTER WITH REMOVABLE MEMORY PACKS FOR CASHIER IDENTIFICATION

[75] Inventors: Koichi Hamano; Takao Morimoto; Junko Watanabe; Kaoru Ono; Norio Yagi, all of Shizuoka, Japan

[73] Assignee: Tokyo Electric Co., Ltd., Tokyo, Japan

[21] Appl. No.: 944,592

[22] Filed: Sep. 21, 1978

[30] Foreign Application Priority Data

Oct. 8, 1977 [JP] Japan ............................... 52-121102
Oct. 8, 1977 [JP] Japan ............................... 52-121105

[51] Int. Cl.² .................... G06F 15/02; G06F 15/20
[52] U.S. Cl. .................................. 364/405; 367/900
[58] Field of Search .............. 364/405, 404, 200, 900

[56] References Cited

U.S. PATENT DOCUMENTS

| 3,859,635 | 1/1975 | Watson et al. | 364/200 |
| 3,946,220 | 3/1976 | Brobeck et al. | 364/405 |
| 3,983,577 | 9/1976 | Youichito et al. | 364/900 |

FOREIGN PATENT DOCUMENTS

| 156832 | 12/1975 | Japan | 364/709 |
| 98924 | 8/1976 | Japan | 364/709 |

Primary Examiner—David H. Malzahn
Attorney, Agent, or Firm—Frishauf, Holtz, Goodman & Woodward

[57] ABSTRACT

An electronic cash register is provided which comprises a keyboard including a plurality of entry keys, function keys and department keys, a memory, a first interface circuit with which a cashier memory pack is mechanically, electrically and disconnectably coupled, a second interface circuit with which a terminal memory pack is mechanically, electrically and disconnectably coupled, and a central processing unit connected to the keyboard, the memory, and the first and second interface circuits in which the sales information generated upon depression of the entry keys, the function keys and department keys are loaded into the memory and at least the sales total for a customer in the sales information is loaded for each transaction into the cashier memory pack and the terminal memory pack.

34 Claims, 29 Drawing Figures

F I G. 1
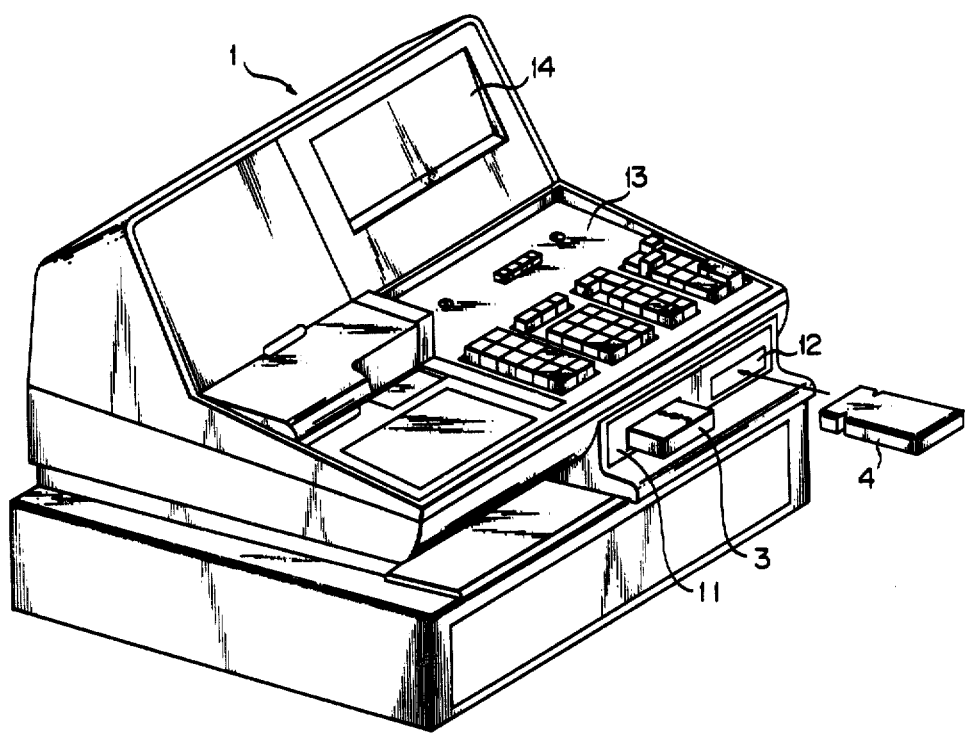

FIG. 22

MEMORY AREA FOR REPORT TABLE

| COUNT MEMORY | TOTAL SALES AMOUNT/DAY MEMORY | TOTAL SALES AMOUNT/WEEK MEMORY | |
|---|---|---|---|
| 0 (CUST) | GROSS SALES | GROSS SALES | ⎫ |
| 1 (RTNC) | RTN | RTN | |
| 2 (VOIDC) | VOID | VOID | |
| 3 (CPN2C) | CPN2 | CPN2 | |
| 4 (BTLC) | BTL | BTL | |
| 5 (ITEM) | NET SALES | NET SALES | |
| 6 (—) | TAX TL | TAX TL | |
| 7 (—) | NS W/O TAX | NS W/O TAX | TOTALIZER |
| 8 (DBC) | DUE BILL | DUE BILL | FOR EACH |
| 9 (—) | CASH TOTAL | CASH TOTAL | TRANSACTION |
| 10 (CHECKC) | CHECK TOTAL | CHECK TOTAL | |
| 11 (MSC) | MISC TOTAL | MISC TOTAL | |
| 12 (—) | FOOD STAMP TOTAL | FOOD STAMP TOTAL | |
| 13 (CPN1C) | COUPON1 TOTAL | COUPON1 TOTAL | |
| 14 (—) | TXBL TOTAL | TXBL TOTAL | |
| 15 (NEGC) | NEG TOTAL | NEG TOTAL | |
| 16 (CVDC) | CVD TOTAL | CVD TOTAL | ⎭ |
| 17 (—) | GT | GT | ⎫ |
| 18 (HROC) | HR0 | HR0 | TOTALIZER |
| 19 (HR1C) | HR1 | HR1 | FOR EVERY HOUR |
| ⋮ | ⋮ | ⋮ | |
| 40 (HR22C) | HR22 | HR22 | |
| 41 (HR23C) | HR23 | HR23 | ⎭ |
| 42 (DP1C) | DP1 | DP1 | ⎫ TOTALIZER |
| ⋮ | ⋮ | ⋮ | FOR EACH DEPARTMENT |
| 51 (DP10C) | DP10 | DP10 | ⎭ |

FIG. 23

```
STORE SALES REPORT

CLOSING  GT              8235478
OPENING  GT              8194606

GROSS SALES                40872
RETURN MDS        2          107
VOID              1           50
COUPON 2          5          234
BOTTLE RETURN     1           10

NET SALES                  40469

TAX                         3852
NET SALES W/O TAX          36617

DB ISSUED         1           48

TOTAL TO ACC. FOR          40517

CASH TOTAL                 31036
CHECK TOTAL       5         8050
MISC TOTAL        1          532
FOOD STAMP                   840
COUPON 1          2           59

TENDER TO ACC. FOR         40517

CASH                         100
FOOD STAMP                     0

TOTAL LOAN                   100

CASH TOTAL                 31136
CHECK TOTAL                 8050
MISC TOTAL                   532
FOOD STAMP                   800
DB REDEEMED                   30
COUPON 1                      59

END OF REPORT
```

FIG. 25

```
STORE  NO 123  DATE    01/03/77

CASHIER  TRANSACTION  REPORT

END OF DAY              17 : 49
CASHIER  NO 0567

GROSS  SALES             13240
ITEM  SOLD         10
CUSTOMER           5

CASH  TOTAL              13240
CHECK  TOTAL        0         0
MISC  TOTAL         0         0
FOOD  STAMP                   0

NET  TO  ACC. FOR        13240

DB  ISSUED          0         0

BALANCE  TO  ACC. FOR    13240

BOTTLE  RETURN      0         0
COUPON  1           0         0
COUPON  2           0         0

NET  SALES               13240

TAX                           0

RETURN  MDS         0         0
VOID                0         0

TAXABLE  TOTAL                0
NEGATIVE  TOTAL               0

END OF REPORT
```

ELECTRONIC CASH REGISTER WITH REMOVABLE MEMORY PACKS FOR CASHIER IDENTIFICATION

BACKGROUND OF THE INVENTION

The present invention relates to an electronic cash register.

Recently, a number of electronic cash registers have been used in super markets, department stores, etc. In general, some cashiers are allotted to each register and they take turns to operate the same cash register. If one of them erronously registers the sales amount, it is almost impossible to find out the cashier who has made the erronous key depression only by seeing the recorded sheet at the end of the work of the day. Accordingly, in this case, all of the cashiers operating the register will have to take the responsibility for the error. Further, when a cashier transfers from his assigned cash register to another cash register in the course of his register operation, it is very difficult to compare cash, credit cards, etc. which the cashier has received and put into the cash tray with the transaction data stored in the electronic cash register resulting from the register operation by the cashier.

In order to solve such problems, a conventional electronic cash register additionally has a memory area included therein for storing the code numbers of the cashiers and the transaction data registered by the individual cashiers. However, in the case where a number of cash registers are installed, as in large scale super markets, a large number of cashiers are necessary corresponding to the number of the registers to be operated, and accordingly, the memory in the cash register for storing the code numbers of the cashiers and the transaction data must have a large memory capacity, thus resulting in expensive cash registers.

SUMMARY OF THE INVENTION

Accordingly, an object of the invention is to provide an electronic cash register with a memory pack which is exclusively used for a cashier and is detachably assembled into the register. In the cash register, the transaction data registered by a cashier is written into the memory pack of the cashier's.

According to one aspect of this invention, there is provided an electronic cash register comprising a keyboard having a plurality of entry keys and at least one function key, memory means, an interface circuit with which a memory pack for cashier is electrically and disconnectably coupled and a data processing unit connected to the keyboard, the memory means and the interface circuit, which enters the sales information produced upon the key operation on the keyboard into the memory means and transfers at least the total amount for each customer in the sales information into the cashier memory pack coupled with the interface circuit.

Other objects and features of the invention will be apparent from the following description taken in connection with the accompanying drawings, reference being had to the accompanying drawings forming a part of this specification wherein like reference characters designate corresponding parts in the several views.

BRIEF DESCRIPTION OF THE DRAWINGS

FIG. 1 is a perspective view of an electronic cash register according to an embodiment of this invention;

FIG. 22 is a memory allotment of a memory used when the store sales report is prepared in the process of FIG. 21;

FIG. 23 is an example of the store sales report prepared in accordance with the process shown in FIG. 21;

FIG. 25 shows an example of the cashier transaction report prepared in accordance with the flow chart in FIG. 24.

DESCRIPTION OF THE PREFERRED EMBODIMENTS

Figure 2:
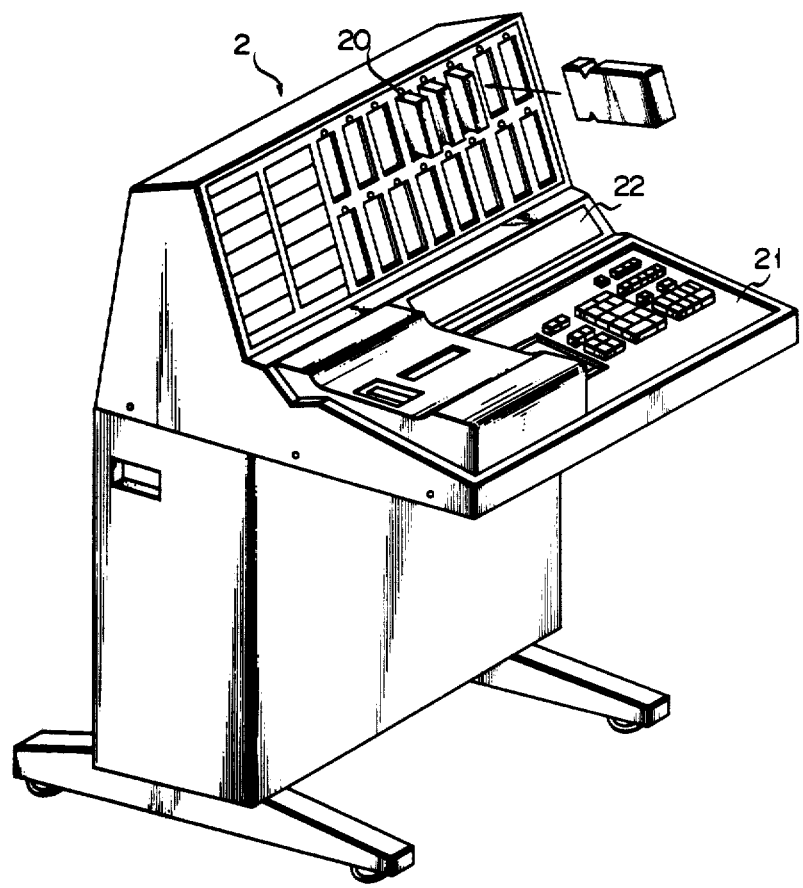
FIG. 2 is a perspective view of a store data processing unit used in combination with the electronic cash register shown in FIG. 1.

Referring now to FIG. 1, there is shown an external appearance of an electronic cash register according to an embodiment of the invention. FIG. 2 shows a store data processor associated with the cash register shown in FIG. 1. The embodiment uses two kinds of memory packs; a memory pack for terminal 3 and a memory pack for cashier 4.

First, a given number of terminal memory packs 3 are inserted into receptacles in the memory pack receiving section 20 of the store data register (SDP) 2. Then, through proper key operations on the keyboard 21, specific terminal code numbers are entered into the terminal memory packs 3 and common data such as a tax table and price looking-up (PLU) data, are successively written into these memory packs 3. In other words, at least part of information to be stored in a random access memory (RAM) of a conventional cash register is loaded into the terminal memory pack 3. Next, cashier memory packs 4 are inserted into the corresponding memory pack receiving section 20 of the SDP 2. Then, through various key operations on the keyboard 21, a cashier code, data and the like are entered into the cashier memory pack 4. The memory packs 3 and 4 stored with the given information are inserted into the corresponding memory pack receptacles 11 and 12 of the cash register 1. After the proper insertion of the memory packs, an operator, i.e. a cashier can properly operate keys on the keyboard 13 to execute necessary works such as registration in the cash register 1, as in the case of the ordinary cash register. The registration data are stored in both the memory packs 3 and 4.

In the course of a days work, when a cashier being engaged in operating a first cash register is ordered to operate a second cash register she has only to insert her cashier memory pack 4 into the receptacle 12 of the second cash register. In this case, registration data resulting from her registering operation in the second cash register is written into her cashier memory pack 4, following the registration data which have been recorded by the registering operation in the first cash register. Loaded into the terminal memory pack 3 of the second cash register is the data resulting from the registering operation executed in the second cash register, irrespective of the cashier. In this manner, the terminal memory pack 3 stores the registration data of a specified cash register and the cashier memory pack 4 stores the registration data by a specified cashier. Cash trays are provided for respective cashiers in practical use and are removable from the cash register. That is, the cash tray carried by a specified cashier who is ordered to change cash registers to operate. Accordingly, the registration data stored in the cashier memory pack must be coincident with items and amount of cash, credit cards and the like accommodated in the cash tray used in the transaction of her work. In the verification, if both are not coincident with each other, this indicates that the cashier has made a registration error or something of the sort. Such a verification is performed at the end of a days work, for example.

The memory packs 3 and 4 storing the registration data thus collected are removed from the individual cash registers 1 at the end of the work of a day and loaded into the SDP 2. The registration data of all the terminal memory packs 3 of given number are all collected to obtain the store sales total in the day, i.e. the net total of all the cash registers in the store. Further, the registering data of all the cashier memory packs are totalized to obtain the sales total of each cashier and the net total of all the cashiers, i.e. the sales total of the store in the day. The sales total thus calculated from the memory packs 3 and 4 may be compared with each other to check the reliability of the sales data collected.

The construction of the SDP 2 follows.

Figure 3:
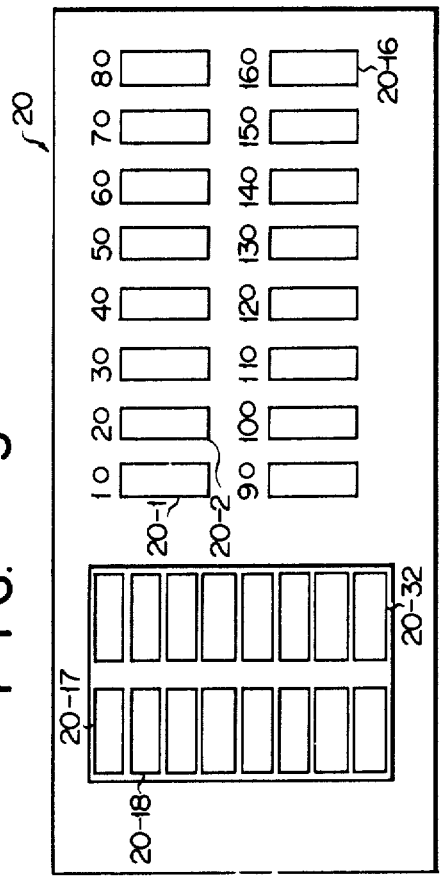
FIGS. 3 to 5 respectively show front views of the receptacles for the memory packs, a display, and a keyboard in the store data processing unit in FIG. 2.

FIG. 3 shows a memory pack receiving section 20 of the SDP 2. For writing and reading data into and from memory packs, the memory packs are loaded into sixteen receptacles 20-1 to 20-16 for memory packs arranged in two rows. The opening of each receptacle is normally closed by a metal plate pivoted at one end to the receptacle. The metal plate is pivotally rotated toward the inside thereof when the memory pack is inserted. The metal plate is used for preventing dust from getting into the receptacle. Each receptacle is provided with the numeral representing the receptacle number and a display lamp for indicating that reading and writing operations are now performed from and into the memory pack. Receptacles 20-17 to 20-32 for keeping memory packs not used are additionally provided adjacent the receptacles 20-1 to 20-16.

Figure 4:
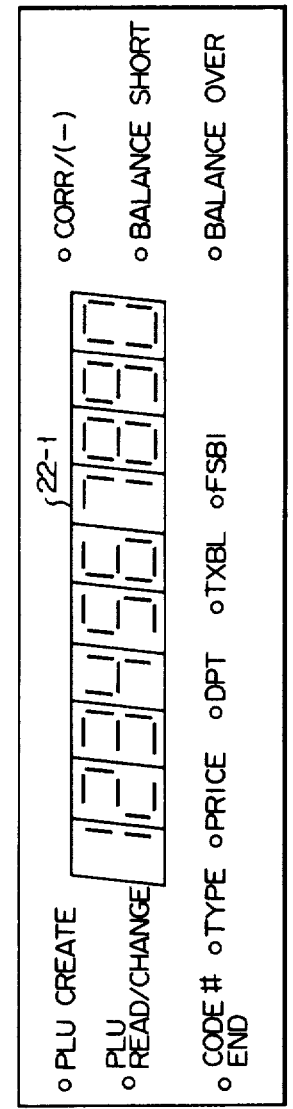

FIG. 4 shows a display section 22 of the SDP 2. In this example, a display unit of ten digits 22-1 is used in which the upper four digits are used to display the code number of a cashier and the number of a memory pack and the lower six digits, to display the amount information.

The display unit 22 in practical use is provided with various display lamps for indicating various operation modes. However, these are not essential to the invention, thus omitting them in the drawing.

Figure 5:
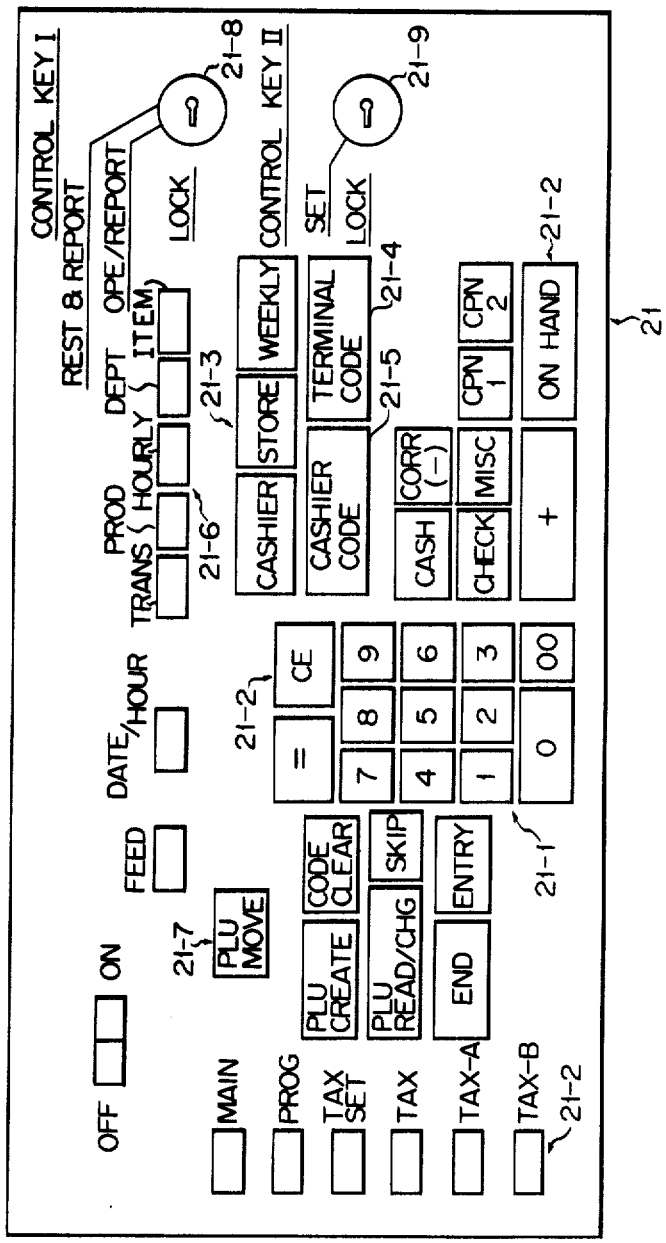

FIG. 5 shows a keyboard 21 of the SDP 2. In the keyboard 21, there are provided eleven entry keys 21-1 for indicating numerals "00", "0" to "9", register keys 21-2 for registering the information relating to receipt and payment of money, sales report keys 21-3 for preparing cashier, store and weekly sales reports, a terminal code key 21-4 for registering the terminal code number of the electronic cash register (ECR), a cashier code key 21-5 for registering the code number of a cashier, sales information selection keys 21-6 for preparing tables about the transaction information, production rate information, sales information per hour, sales information for each department, and sales information for each item code, and control keys 21-7 and 21-8 for setting operational modes. Keys 21-3 are used to effect data transmission and reception with respect to a terminal memory pack and are called "terminal keys". When the sales information selection key is once depressed, it is held at the depressed position until it is again depressed to be released.

Figure 6:
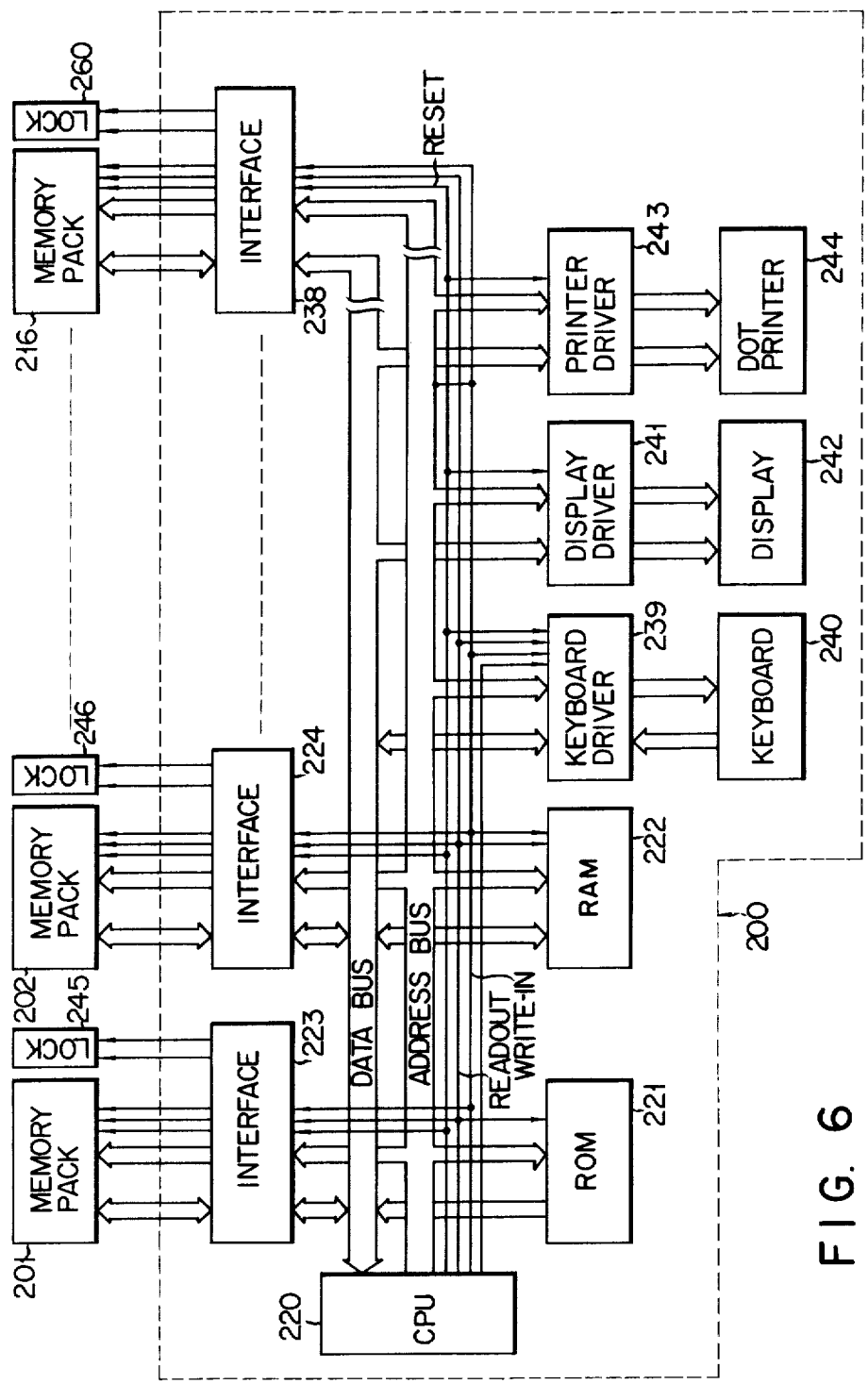
FIG. 6 is a block diagram of the store data processing unit in FIG. 2.

FIG. 6 shows an electronic circuit section 200 of the SDP 2, and sixteen memory packs 201 to 216 coupled with the electronic circuit section 200, and lock circuits 245 to 260 for locking these memory packs 201 to 216. The electronic circuit 200 is comprised of a central processing unit (CPU) 220, a read only memory (ROM) 221, a random access memory (RAM) 222, and, sixteen memory pack interfaces 223 to 238 for electrically coupling the CPU 220 with memory packs 201 to 216. These interfaces will subsequently be described later. The CPU 220 is coupled with a keyboard circuit 240 via a keyboard drive circuit 239 to be described later in detail. The same is connected to a display circuit 242 via a display drive circuit 241, and to a dot printer 244 via a printer drive 243. The CPU 220 is connected to the lock circuits 245 and 260 by way of the interfaces 223 and 233.

Figure 7:
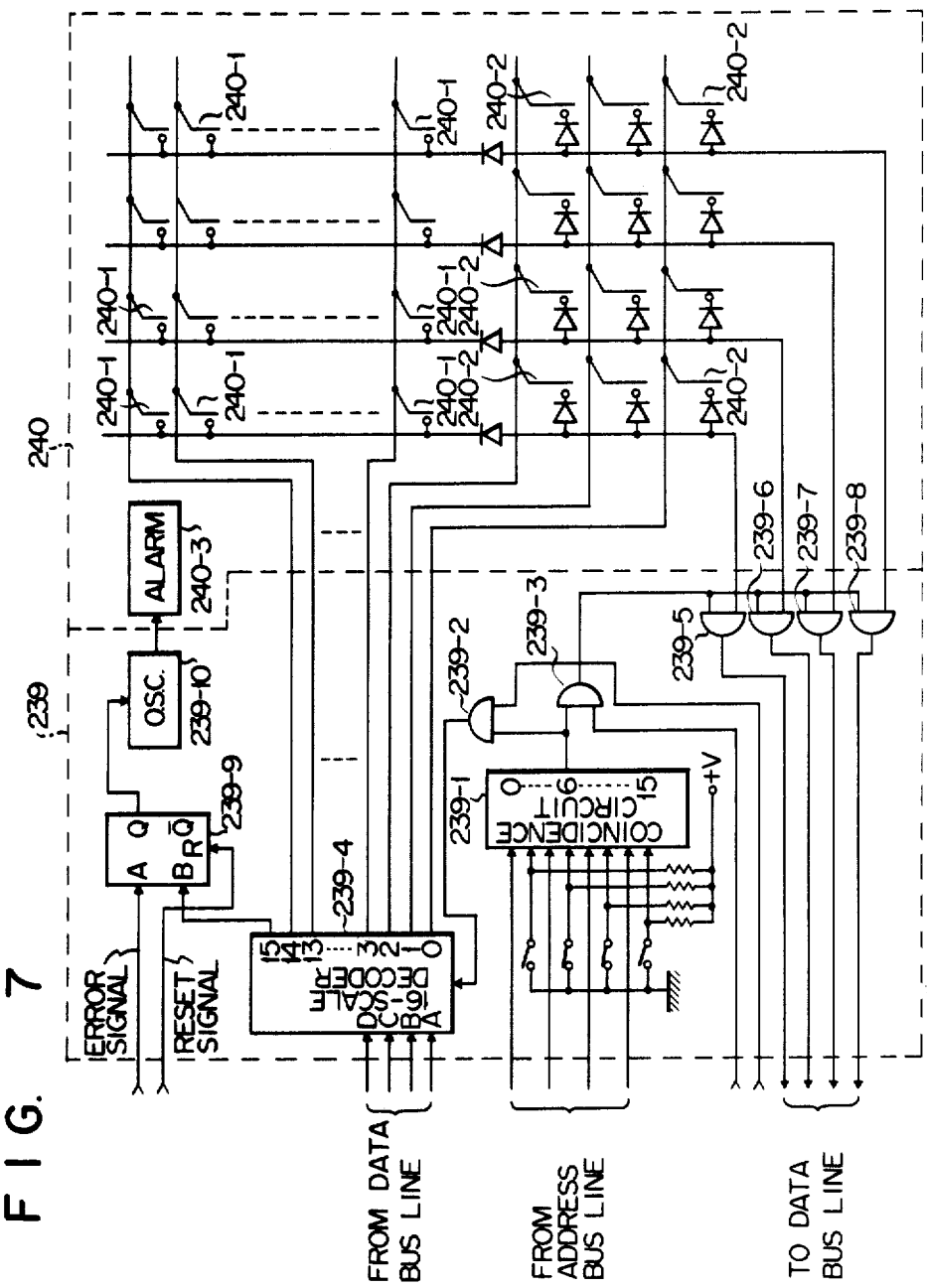
FIG. 7 is a detailed circuit diagram of a keyboard drive circuit and a keyboard circuit shown in FIG. 6.

FIG. 7 illustrates the details of the keyboard drive circuit 239 and the keyboard circuit 240. When an address signal "0110", for example, is delivered through an address bus line from the CPU 220, an address coincidence circuit 239-1 of the keyboard drive circuit 239 detects that the keyboard drive circuit 239 is selected. Upon the detection, the coincidence detection circuit 239-1 supplies an output signal from an output terminal "6" to AND gates 239-2 and 239-3. As a result, a write signal delivered through a write line from the CPU 220 is applied to a scale-of-16 decoder 239-4 thereby to set the decoder 239-4 to be operative. Thus conditioned decoder 239-4 responds to a data signal delivered through a data bus line from the CPU 220 to sequentially and repetitively produce at the output terminals "0" to "15" output pulses to keys 240-1 and 240-2 arranged in a key matrix of the keyboard circuit 240. The respective keys of the key matrix correspond to those shown in FIG. 5. The output signals of the key matrix are transferred through four AND gates 239-5 to 239-8 and bus lines to the CPU 220. The AND gates 239-5 to 239-8 are energized by a read signal delivered through the read line and the AND gate 239-3 from the CPU 220. In this manner, the CPU 220 detects what key is operated on the keyboard 21.

When an erroneous key is depressed, an error signal generated from the CPU 220 is applied to the input terminal A of a bistable multivibrator 239-9 via an error signal line. Upon the application, the multivibrator 239-9 produces at the output terminal Q a high level signal to be directed to an oscillator 239-10. The high level signal drives the oscillator to start its oscillation. The output signal from the oscillator 239-10 drives an alarm 240-3 to give an alarm. The multivibrator 239-9, after the error is removed, is switched in its state by an output pulse generated from the output terminal "15" of the decoder 239-4 and produces at the output terminal Q a low level signal to stop the operation of the oscillator 239-10.

Figure 8:
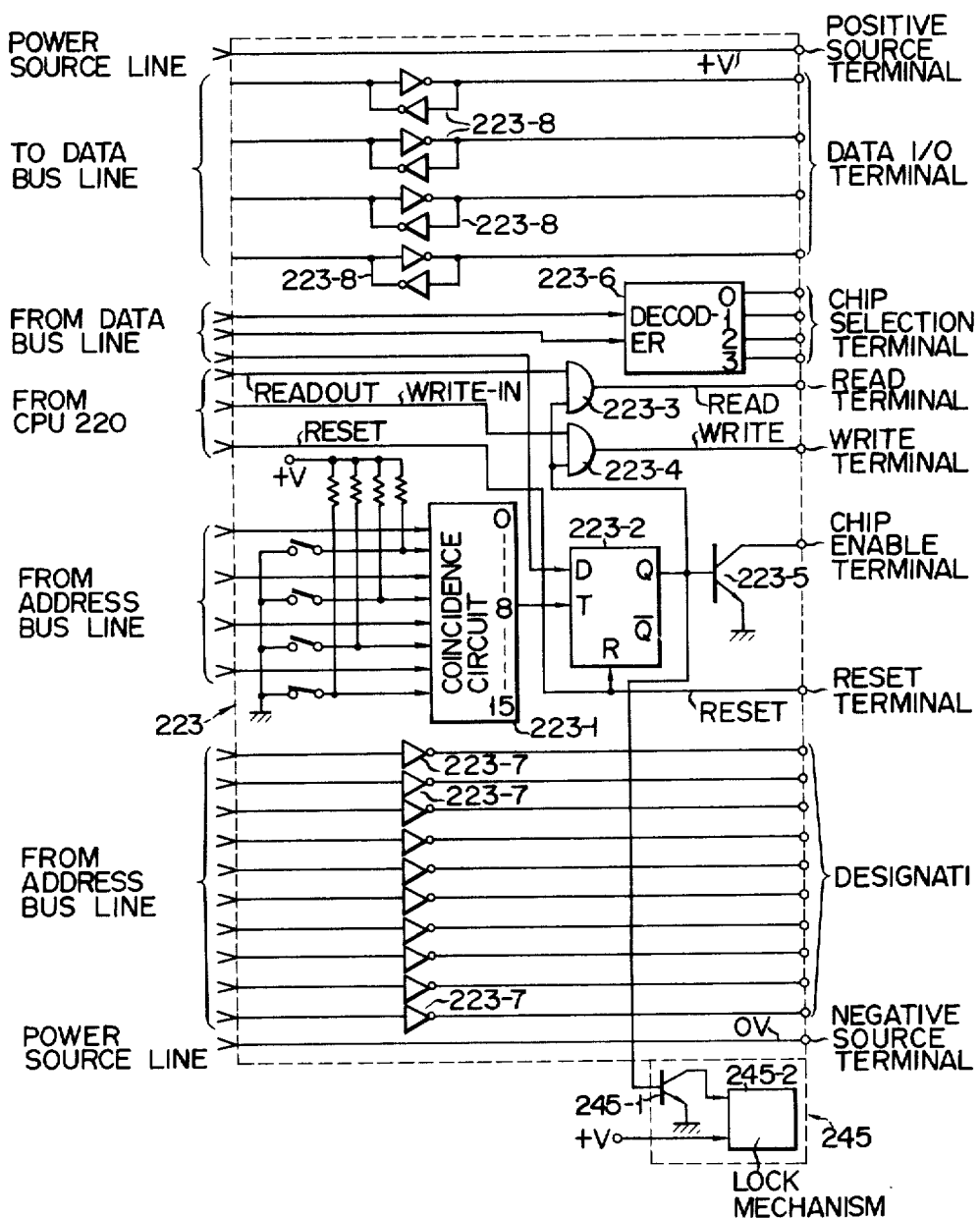
FIG. 8 is a circuit diagram of an interface circuit used in the FIG. 6 circuit.

FIG. 8 shows the detail of the memory pack interface 223 shown in FIG. 6. The remaining interfaces 224 to 228 each have the same construction as that of the interface 223 except that the address coincidence circuits 223-1 have their own codes.

The coincidence detection circuit 223-1 of the interface 223, as in the coincidence detection circuit 239 shown in FIG. 7, delivers at the output terminal "8", for example, to the input terminal T of the flip-flop circuit 223-2 when an address signal corresponding to a proper code formed by a plurality of switches is delivered thereto from the CPU 220. Under this condition, when the CPU 220 supplies a signal to the input terminal D of the flip-flop circuit 223-2 through the data bus line, the flip-flop circuit 232-2 supplies an output signal to the AND gates 223-3 and 223-4, and a transistor 245-1 of the lock circuit 245, thereby to enable the AND gates and at the same time render the transistors 223-5 and 245-1 conductive. Accordingly, the lock circuit 245 is energized to be in locking state and the read and write signals delivered through the read and write lines pass through the AND gates 223-3 and 223-4. The reset terminal R of the flip-flop 223-2 is connected to the reset line coming from the CPU 220.

Responsive to the information signal delivered through the data bus line from the CPU 220, the decoder 223-6 produces at output terminal "0", "1", "2" or "3" an output signal to select a memory chip of the memory pack coupled with the interface 223. The addressing of the memory pack is performed through a plurality of addressing lines including inverter 223-7 with buffer functions, and data transfer between the memory pack and CPU 220 is effected through a plurality of data lines including inverters 223-8 with bidirectional buffer functions.

Figure 9:
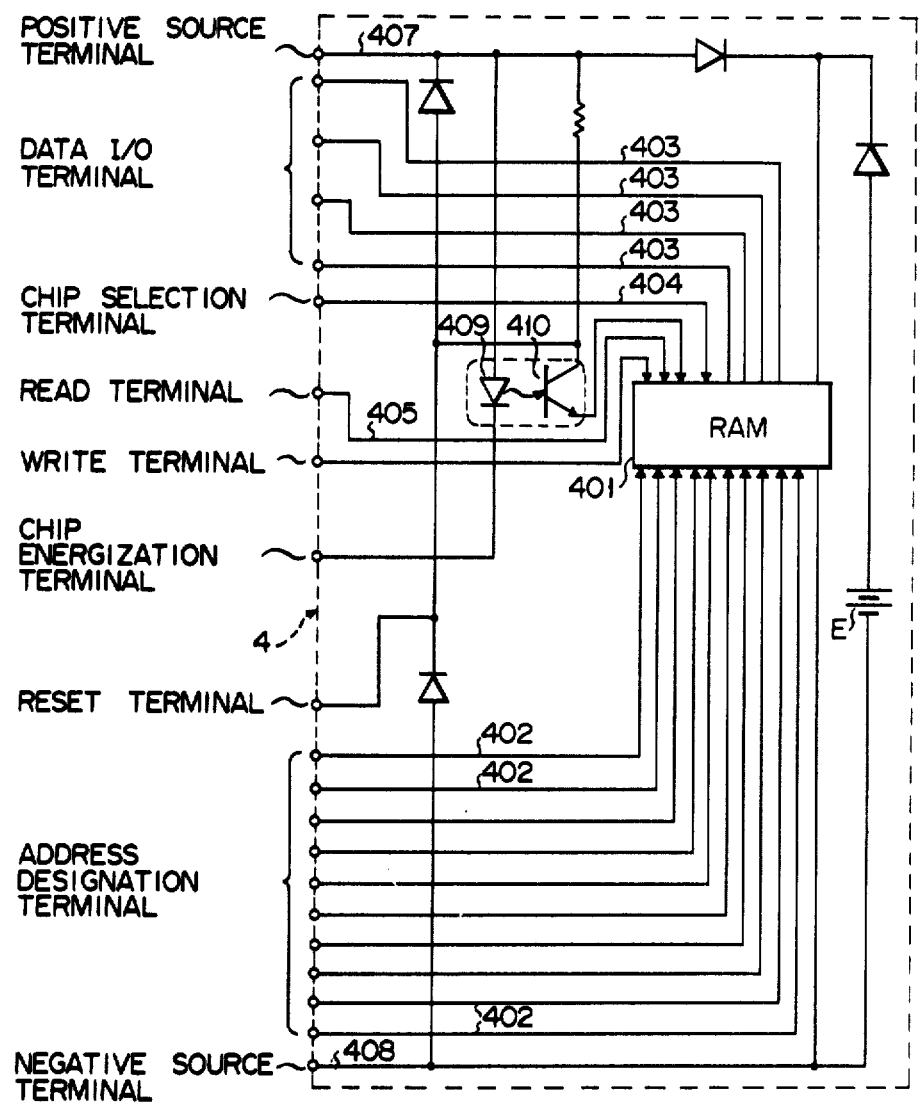
FIGS. 9 and 10 show circuit diagrams of a cashier memory pack and a terminal memory pack used in the FIG. 6 circuit.

FIG. 9 shows a circuit diagram of a cashier memory pack 4. The memory pack 4 is inserted into the memory pack receiving section 20 of the SDP 2, so that the memory pack 4 circuit is coupled with the interface 223 shown in FIG. 8. In more particular, a plurality of addressing lines 402 for addressing the random access memory (RAM) 401 are coupled with addressing lines with inverters 223-7. A plurality of data lines 403 for the RAM 401 are coupled with data lines with inverters 223-8. A selection line 404 for selecting the RAM 401 is coupled with the output terminal "0" of the decoder 223-6, and the read line 405 and the write line 406 for the RAM 401 are coupled with the AND gates 223-3 and 223-4, respectively.

When the memory pack 4 is coupled with the interface 223, reading and writing of data from and to the RAM 401 are performed by an external power supply (not shown) through power source lines 407 and 408 of the memory pack 4 and a power source line of the interface 223. When the memory pack 4 is removed from the interface 223, the contents stored in the RAM 401 are held by an internal power source E.

In order to energize the RAM 401, this example uses a combination circuit of a photodiode 409 and a phototransistor 410. When the memory pack 4 is coupled with the interface 223 and an output Q of the flip-flop 223-2 renders the transistor 223-5 conductive, current flows through the collector-emitter path of the transistor 223-5 and the photodiode 409. The photodiode 409, responsive to this current, emits light, and the phototransistor 410 conducts, with the result that an energizing signal from an external power source is applied to the RAM 401 through the collector-emitter path of the phototransistor 410.

Figure 10:
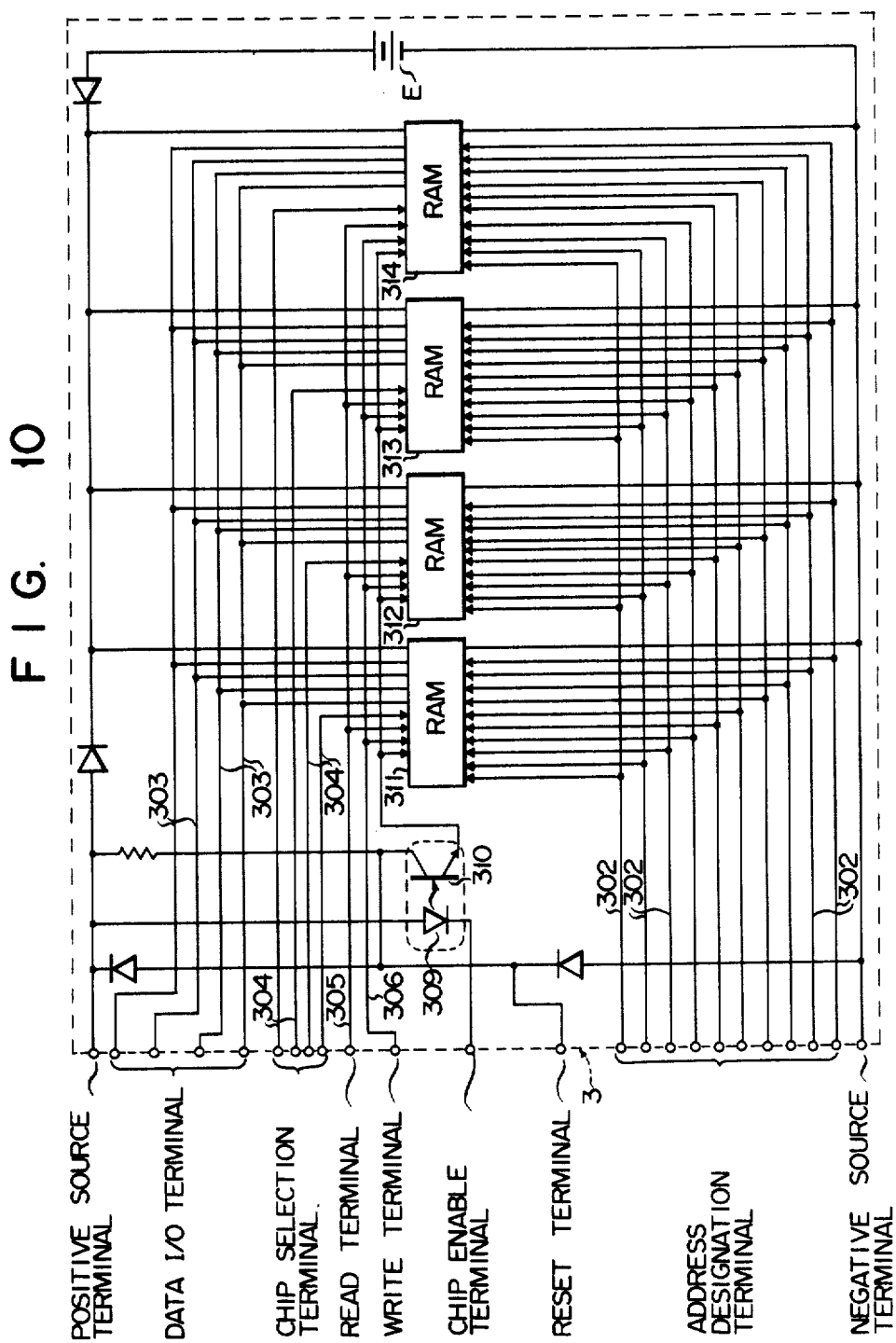

FIG. 10 shows a circuit diagram of the terminal memory pack 3. The circuit uses four RAMs 311 to 314 which are substantially the same as the cashier memory pack 4 shown in FIG. 9, except that four chip selection lines 304 for selecting these RAMs are coupled with the output terminals "0", "1", "2" and "3" of the interface 223, respectively.

The construction of the cashier register 1 shown in FIG. 1 is explained more in detail.

Figure 11:
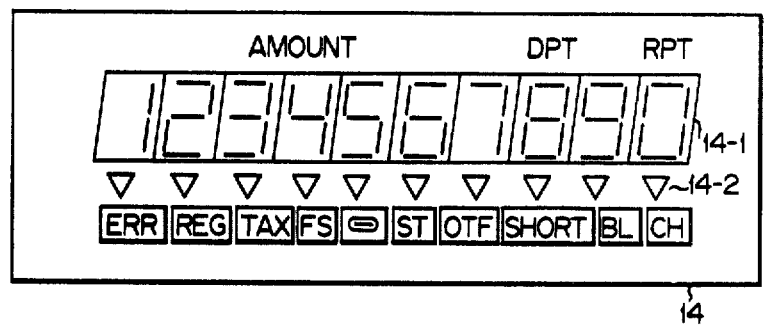
FIGS. 11 and 12 show front views of a display section and a keyboard of the electronic cash register shown in FIG. 1.

FIG. 11 shows a display section 14 used in ECR 1. The display section 14 is provided with a display unit 14-1 of ten digits. The upper six digits of the display unit 14-1 is used to display amount of money and the lower four digits thereof are used for the department and a repeat display. Incidentally, the display section 14 is provided with a plurality of display lamps 14-2 for indicating various operation modes.

Figure 12:
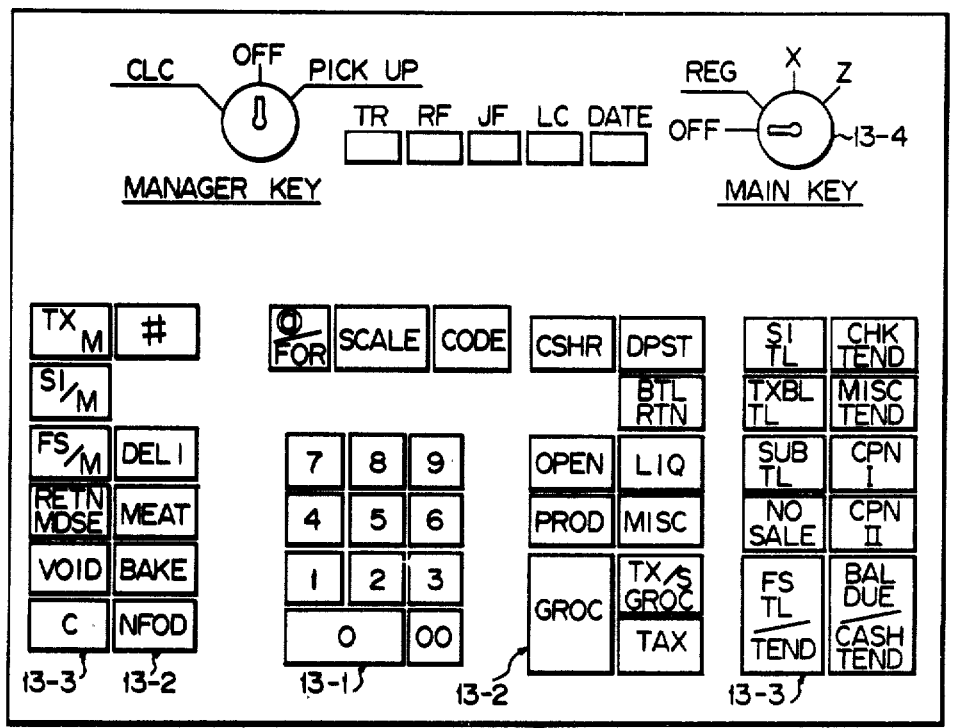

FIG. 12 shows the detail of the keyboard 13 of the ECR 1. The keyboard 13, as is well known, includes 11 entry keys 13-1 operated when numerals "00", "0" to "9", a department key 13-2 for registering sold items for each department, a function key 13-3 for registering the contents of transaction, and a main key 13-4 for setting up a registering operation mode and the like.

Figure 13:
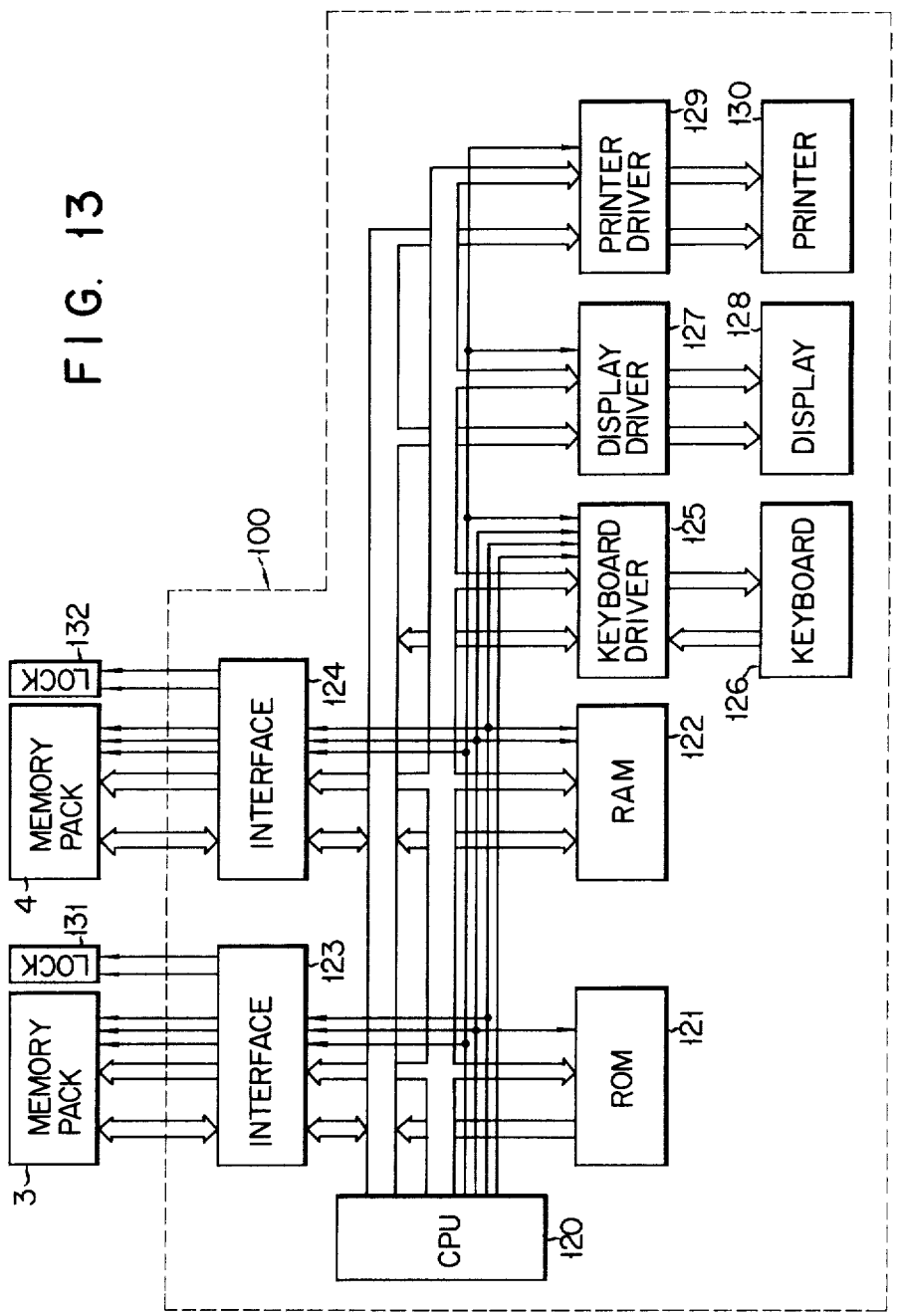
FIG. 13 is a block diagram of the electronic cash register shown in FIG. 1.

FIG. 13 shows an electronic circuit 100 of the ECR 1 and the cashier and terminal memories 4 and 3 shown in FIGS. 9 and 10 coupled with the electronic circuit 100. The electronic circuit 100 includes a central processing unit (CPU) 120, a read only memory (ROM) 121, a random access memory (RAM) 122, a terminal memory pack interface 123 for electrically coupling the terminal memory pack interface 123 with the CPU, and a cashier memory pack interface 124 for electrically coupled the cashier memory pack 4 with the CPU 120. The CPU 120 is connected to a keyboard circuit 126 through a keyboard drive circuit 125 to be described later, a display circuit 128 through a display drive circuit 127 and to a printer circuit 130 through a printer drive circuit 129. The CPU 120 is also coupled with lock mechanisms 131 and 132 for locking the memory packs 3 and 4 through interfaces 123 and 124.

Figure 14:
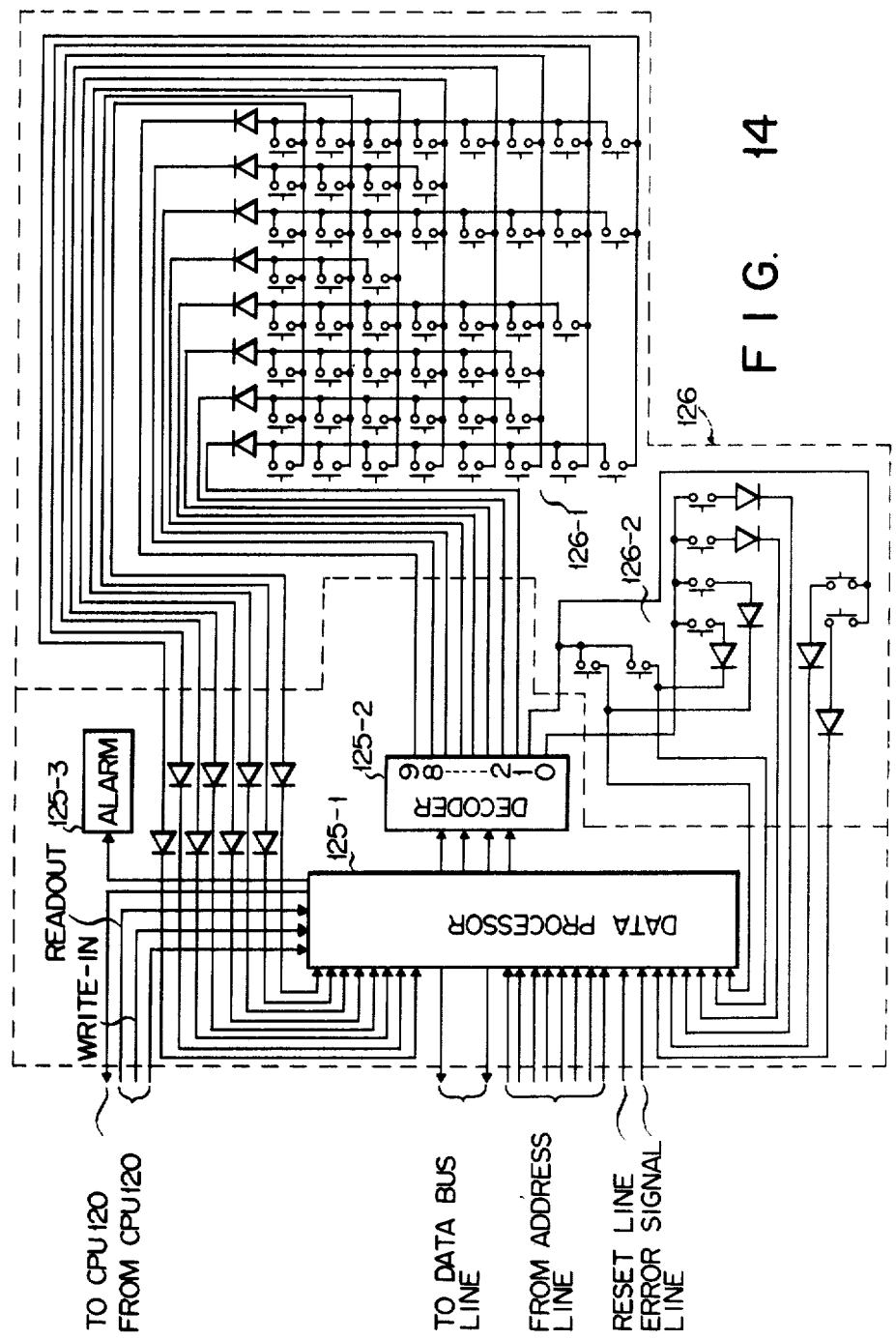
FIG. 14 is a circuit diagram of a keyboard drive circuit and a keyboard circuit shown in FIG. 13.

FIG. 14 shows a circuit diagram for illustrating the details of the keyboard drive circuit 125 and the keyboard circuit 126. This circuit is principally equal to the circuit shown in FIG. 7. The data processing circuit 125 has function of the address coincidence circuit 239-1, the AND gates 239-2 and 239-3 and part of the CPU 220, and this circuit is constituted by an INTEL 8279, for example. The decoder 125-2, responsive to an address signal from the data processing circuit 125-1, successively and repeatedly produces output pulses from the output terminals "0" to "9". The keyboard circuit 126 is formed of a key matrix 126-1 having a plurality of keys including entry keys, department keys, function keys and the like and a key array 126-2 having a plurality of keys corresponding to the control keys. When one of the keys of the key matrix 126-1 is operated, the key operation is detected by one of the output pulses from the decoder 125-2 and the information relating to the key operation is sent to the data processing circuit 125-1. The data processing circuit 125-1, upon recept of the information relating to the key operation, supplies the key information corresponding to the input information to the CPU 120 through the data bus and delivers a signal indicating the key operation to the CPU 120 through a key operation detection line. When one of the keys of the key array 126-2 is operated, the key operation is detected by an output pulse from the decoder 125-2 and information relating to the key operation is applied to the CPU through a data bus and at the same time a key operation detection signal from the data processing circuit 125-1 is applied to the CPU 120 through a key operation detection line.

In this manner, the circuit shown in FIG. 14 transfers the information corresponding to the key operated to the CPU 120 as well as in FIG. 7.

Figure 15:
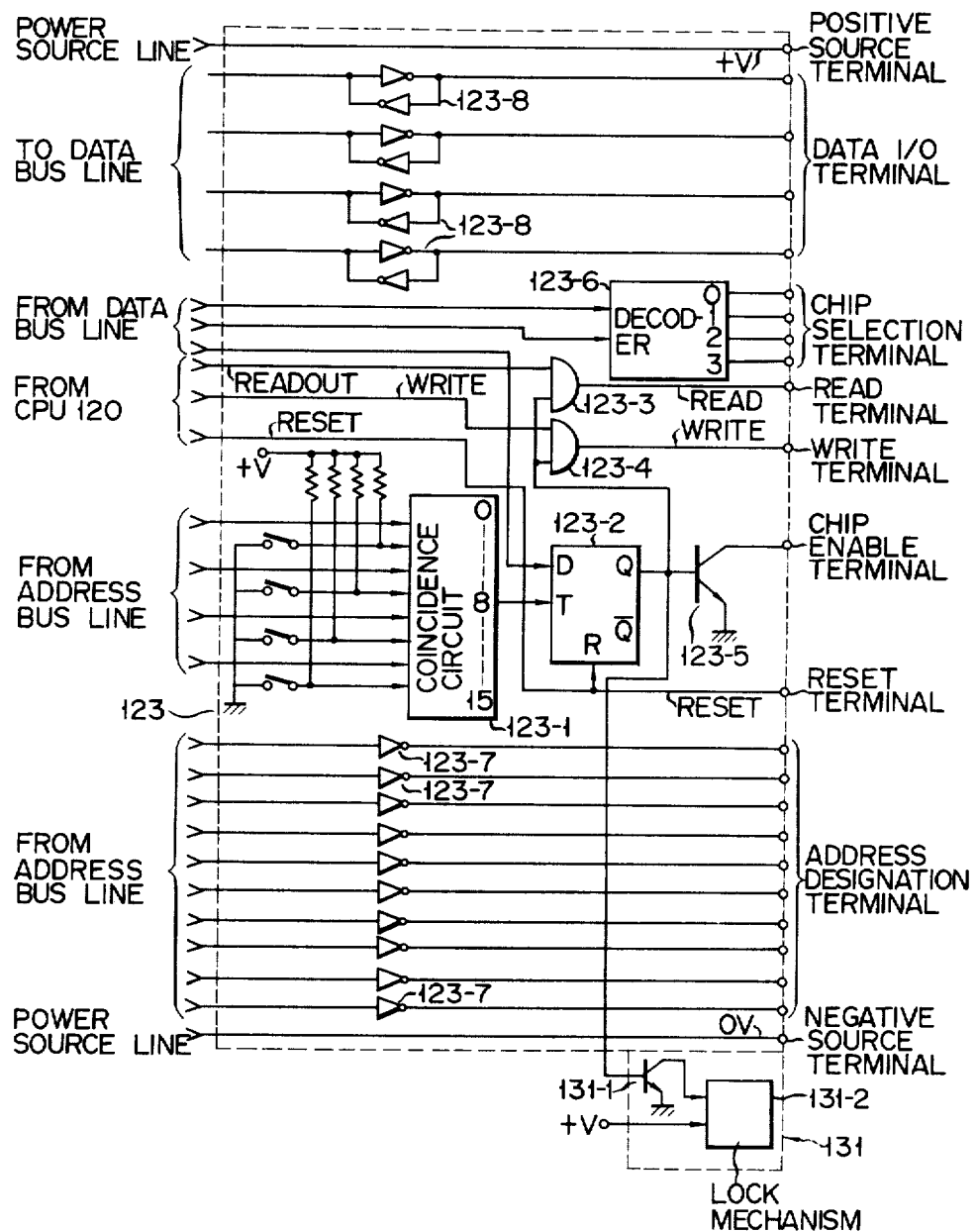
FIG. 15 is a circuit diagram of an interface circuit shown in FIG. 13.

FIG. 15 shows a circuit of the terminal memory pack interface 123. The interface 123 is similar in construction and operation to the interface 223 of the SDP 2 shown in FIG. 8. In the terminal memory pack interface 123 shown in FIG. 15, like reference numerals designate like circuits in FIG. 8. As a matter of course, the coincidence detection circuit 123-1 may be designed so as to assign a specific or inherent code to the address coincidence circuit 123-1. In the interface 123-1, where the code recorded in the memory pack coupled with the interface 123-1 is coincident with the code entered into the RAM 122 by the operation of the entry keys and code key, a data process initiation signal is supplied from CPU 120 to the input terminal D of the flip-flop circuit 123-2 through a data bus. The interface 124 for the cashier memory pack is of the same construction as that shown in FIG. 15 except that it is formed to have a different code. The decoder 123-6 may be omitted in the cashier memory pack interface 124.

The operation of the ECR 1 and the SDP 2 will be given below.

Figure 16A:
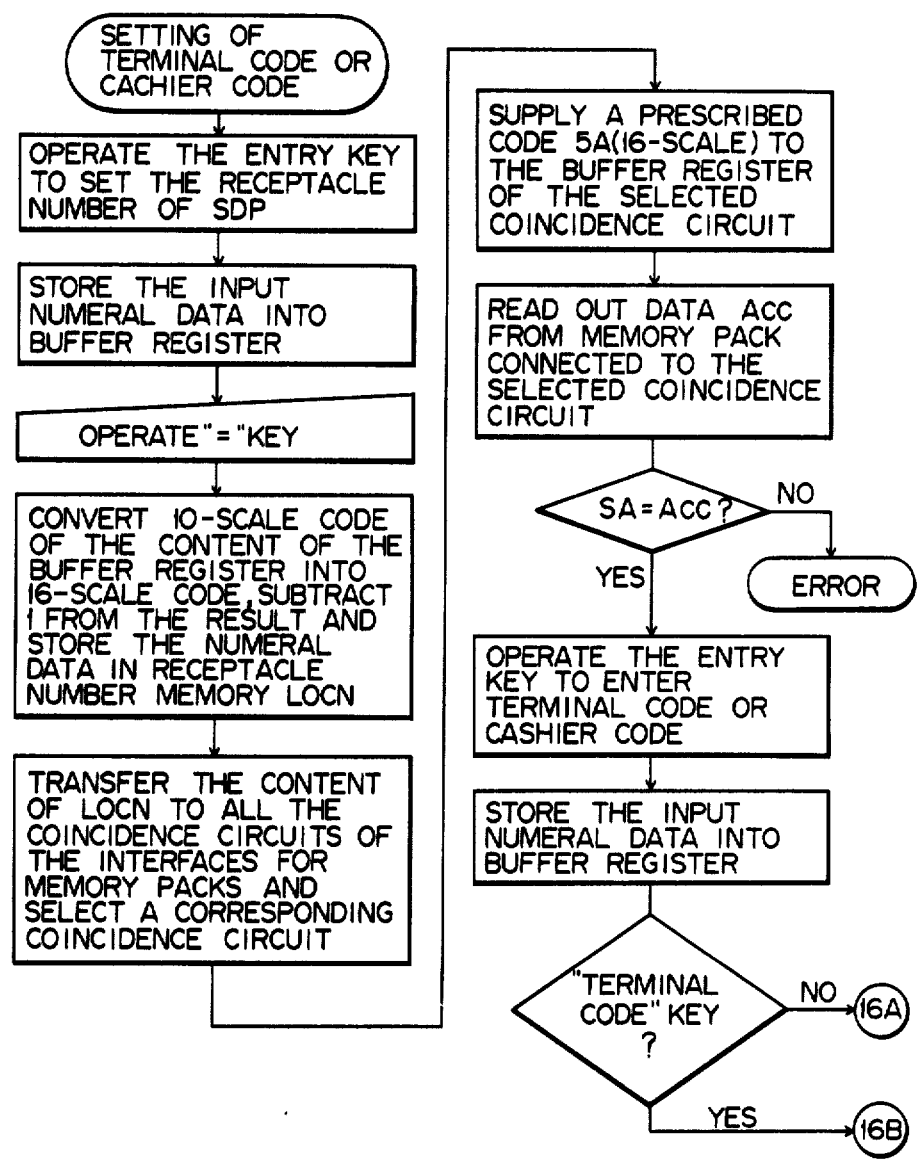
FIGS. 16A and 16B show flow charts of steps for entering specific codes into the cashier memory pack and the terminal memory pack.
Figure 16B:
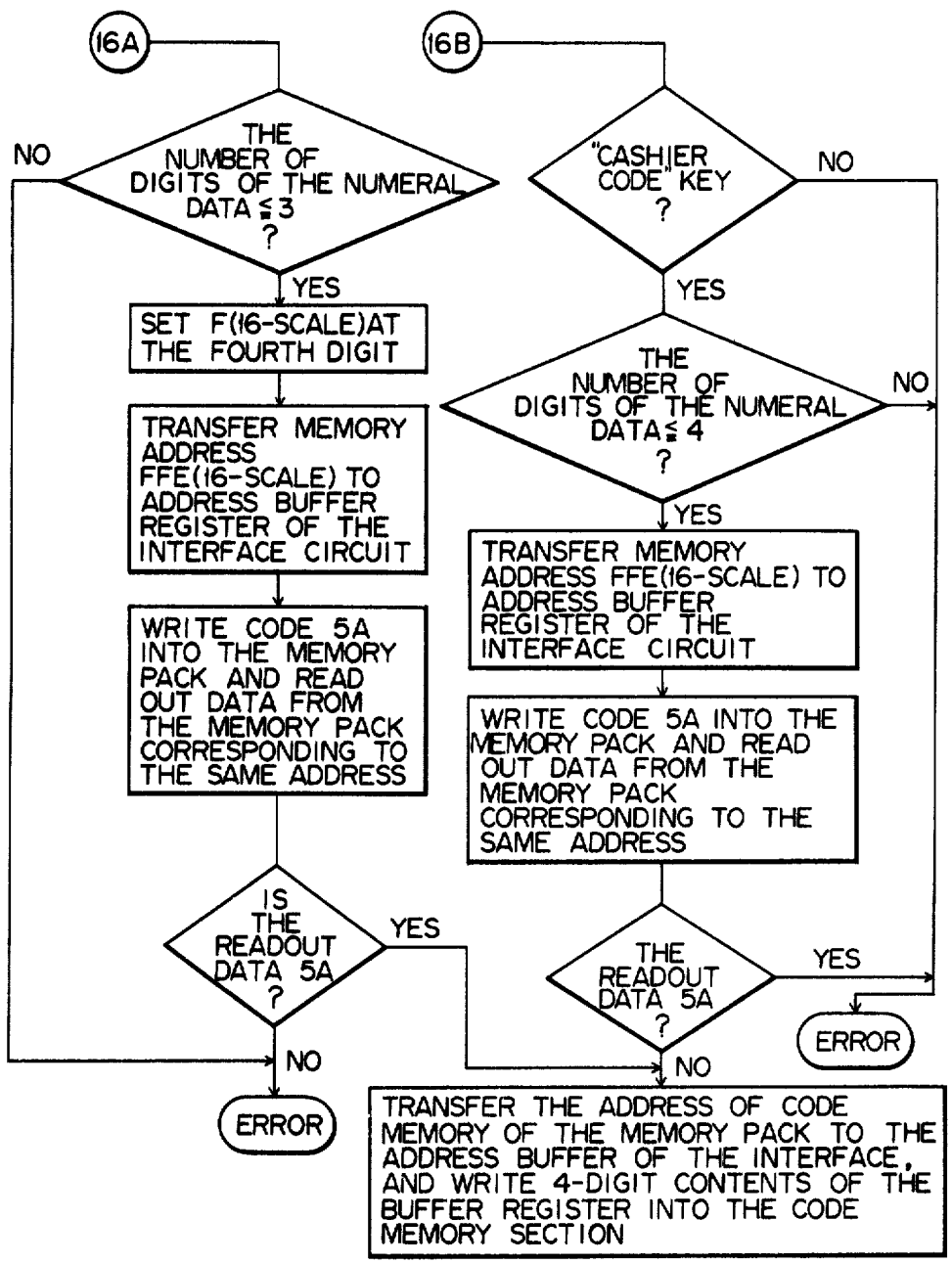

First a given number of terminal memory packs 3 to be used are loaded into the receptacles of the memory pack receiving section 20 of the SDP 2. In order to enter a terminal code into one of the terminal memory packs 3, the numeral information corresponding to the proper code of one of the address coincidence circuits 223 in the memory pack interfaces 223 to 238 (FIG. 6) is transferred to the coincidence detection circuit 223-1 by operating the entry key 21-1 (FIG. 5). Then, an "=" key in the function keys 21-2 is operated so that a signal is delivered to the D input terminal of the flip-flop circuit 223-2 which in turn produces at the Q terminal a high level signal. As a result, a given RAM, for example, RAM 311, in the terminal memory pack 3 is energized. The numeral information representing a desired terminal code is loaded into the RAM 311 by operating the entry key 21-1 and the terminal code key 21-4. The same operation will be performed when the terminal code is entered into another terminal memory pack. FIG. 16 is a flow chart for illustrating a process for setting up terminal code or cashier code.

Figure 18:
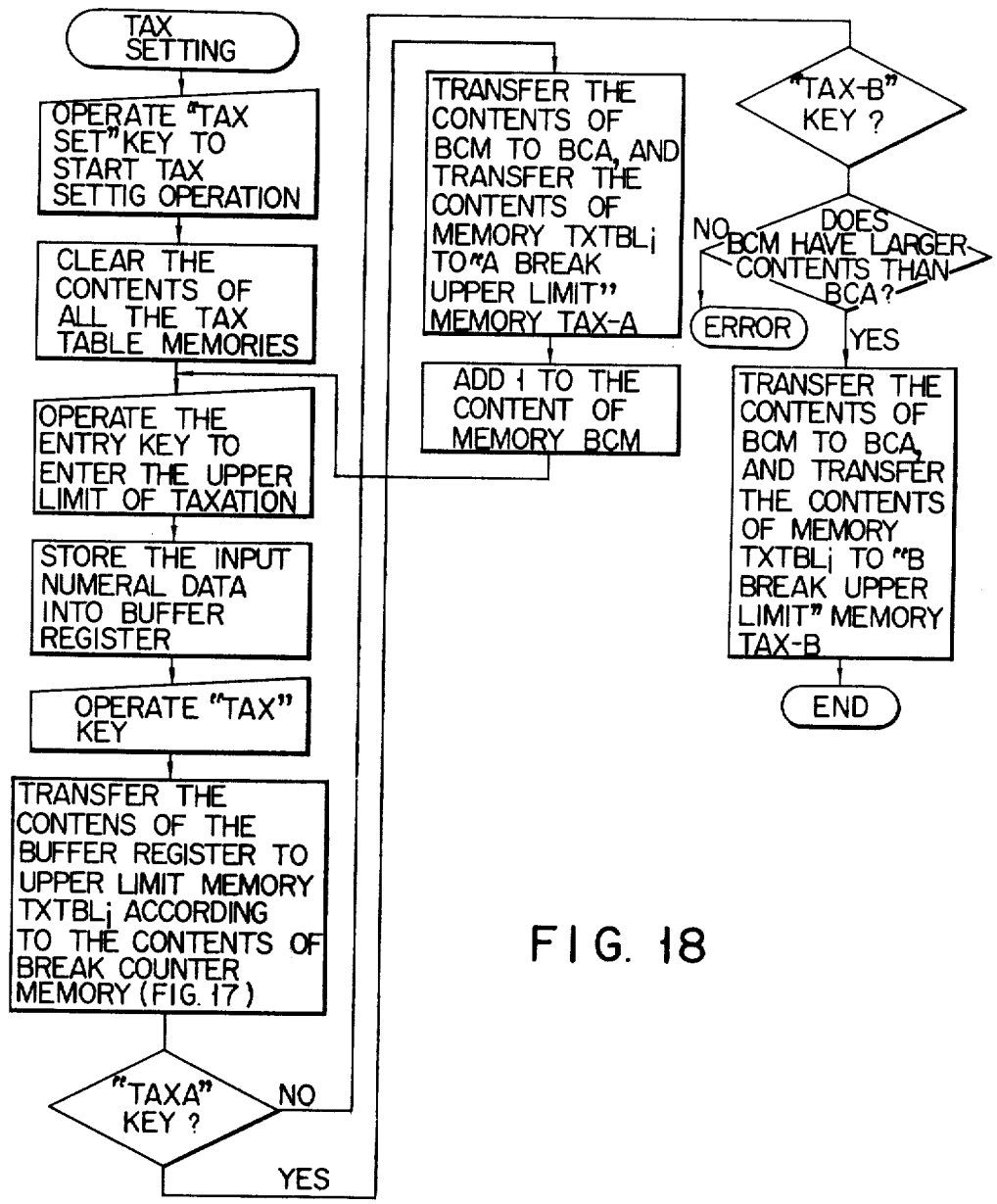
FIG. 18 shows a flow chart of steps for entering the tax information into the terminal memory pack.

A proper terminal code is recorded onto all the terminal memory packs, and required information is written into the terminal memory pack. The information writing operation is similar to the case where, in a conventional ECR, desired information is entered into the RAM of the register. Here, let us consider the case of loading of tax information, as shown in the flow chart in FIG. 18.

Figure 17A:
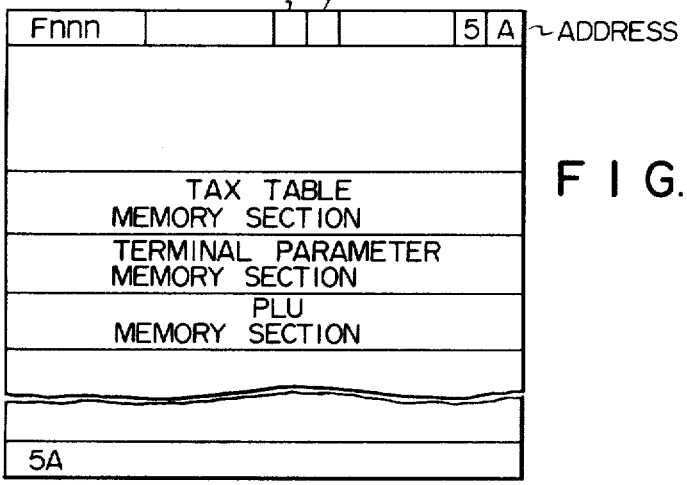
FIGS. 17A and 17B illustrate memory areas of the terminal memory pack and the cashier memory pack, respectively.
Figure 17B:
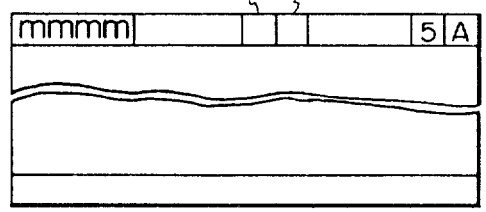
Figure 19:
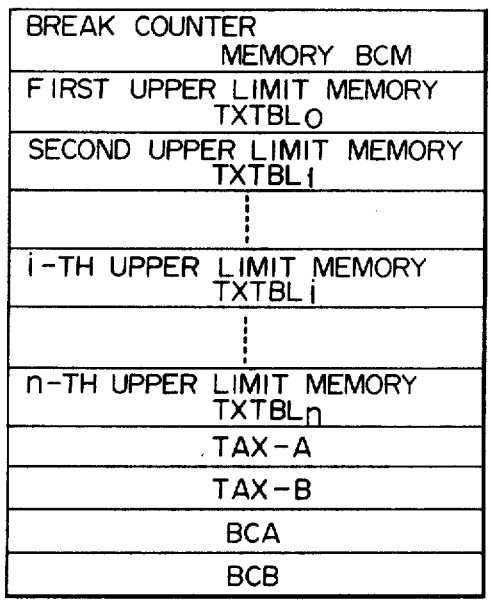
FIG. 19 shows an example of tax table entered into the terminal memory pack in the process in FIG. 18.

A "TAX SET" key in the function keys 21-2 is first operated to make ready for writing tax information into the ECR. After operation of the entry key 21-1, the upper limit of a tax imposed on article is loaded into the first upper limit memory of the tax memory area of the RAM 222 as shown in FIG. 17 by operating the "TAX" key. Then, if the "TAX-A" key is operated, the contents of the first upper limit memory are transferred to the TAX-A memory and, if the "TAX-B" key is operated, the contents are transferred to the TAX-B memory. Similar operations will be repeated so that the tax table is loaded into the RAM 222 of the SDP. In this manner, various data as shown in FIG. 17A are loaded into the terminal memory pack.

Then, the PLU MOVE key of the function key 21-2 is operated so that the CPU 220 successively and selectively energizes the interfaces 223 to 238 thereby to allow the contents of the RAM 222 to be loaded into proper locations of the RAM 311 to 314 of the terminal memory packs.

As described above, desired information is loaded into the RAM of the SDP 2 in a similar procedure of the conventional ECR and the information is loaded into a plurality of terminal memory packs substantially at the same time. Then, these terminal memory packs are inserted into the memory pack receptacles of the ECRs 1. Accordingly, the same information may be loaded into the memory sections of these ECRs 1. In this respect, the invention highly improves over the conventional ECRs in the loading of the same information.

The recording procedure of the cashier code onto the cashier memory packs 4 is the same as that of the terminal code, except that the cashier code key is operated in place of the terminal code key. Loaded into the cashier memory pack are various data including these shown in FIG. 17B, for example.

If necessary, data "1" is loaded into the "SIGN-ON" memory area in the RAMs of the terminal memory packs 3 and cashier memory packs 4 both having stored various information. The memory packs where the "SIGN-ON" flag is generated are usable while the memory packs where the SIGN-ON flag is not generated are unusable. The loading of the data "1" into the SIGN-ON memory area is executed in a manner that the control key 21-8 is set and then the entry key "1" and the terminal code key 21-4 or the cashier code key 21-5 are operated.

In the embodiment, terminal memory packs into which terminal codes, SIGN-ON flags, desired information and the like are entered in the above manner and the cashier memory packs having cashier codes, SIGN-ON flags and the like thus stored are inserted into the memory pack receptacles 11 and 12, respectively. Then, the main key 13-4 is set to the REGISTER position and the entry key 13-1 is operated to load the cashier code of the cashier memory pack 4 into the RAM 122 of the ECR 1. Following this, the CSHR key is operated. Upon the operation of the CSHR key, the CPU 120 compares the cashier code now entered with the cashier code stored in the cashier memory pack 4 and compares the terminal code stored in the RAM of the ECR 1 with the terminal code stored in the terminal memory pack, and checks whether the SIGN-ON flags are generated or not in the SIGN-ON memory areas of the terminal memory packs. When the coincidence in the terminal codes and in the cashier codes are detected and SIGN-ON flags are generated, the ECR 1 is operable as an ordinary ECR operates. On the other hand, when any one of the codes is not coincident or SIGN-ON flag is not generated, the CPU 120 issues an error signal to drive an alarm 125-3. After that, the terminal memory pack or the cashier memory pack is pulled from the receptacle, the CPU 120 detects this condition and issues a clear signal to that memory section of the RAM 122 storing the cashier code to clear the cashier code from the RAM 122.

Figure 20:
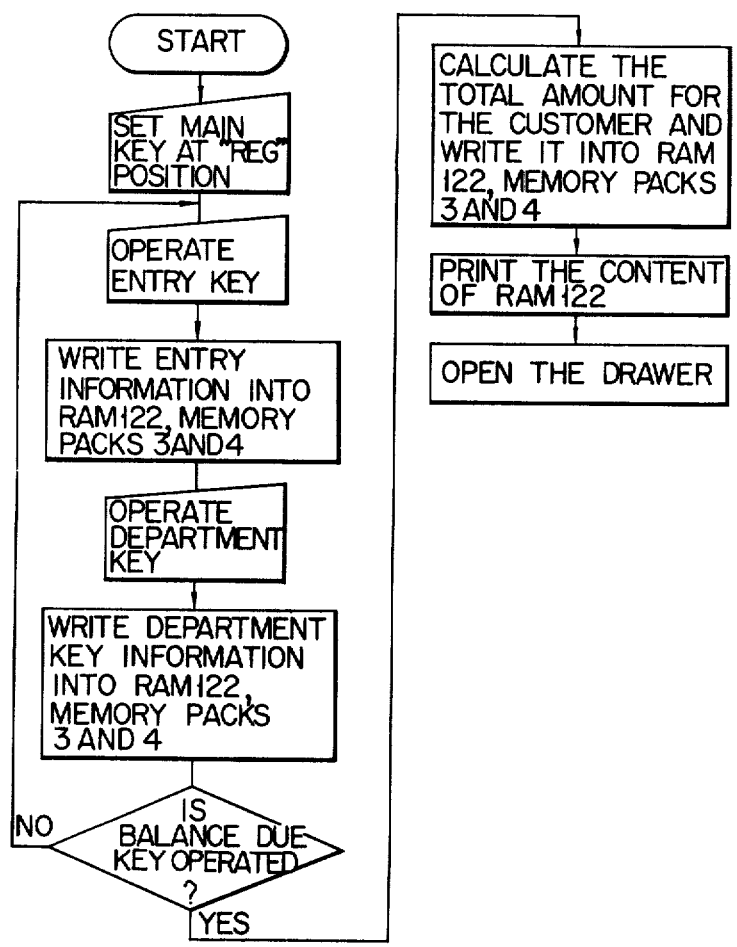
FIG. 20 shows a flow chart of steps for registration.

After the terminal memory packs and the earlier memory packs are properly set in this manner, the ECR 1 may perform its registering operation as an ordinary electronic cash register codes. As in FIG. 20, the main key 13-4 is first set at REG position and then the entry key 13-1 is operated to register an amount of sold items into the ECR 1. At the next step, the department key 13-2 is depressed to register the department of sold items. Through operations of respective entry keys 13-1 and the department keys 13-2 corresponding to individual items, the registering work is executed so that the registering contents are commonly loaded into the terminal memory packs 3 and the cashier memory packs 4. Additionally, loaded into the terminal memory packs 3 are the sales total data for each department and each transaction. The registering operation for this is well known as disclosed in U.S. Ser. Nos. 799,987 and 800,943, now U.S. Pat. Nos. 4,142,235 and 4,144,567, respectively.

Figure 21:
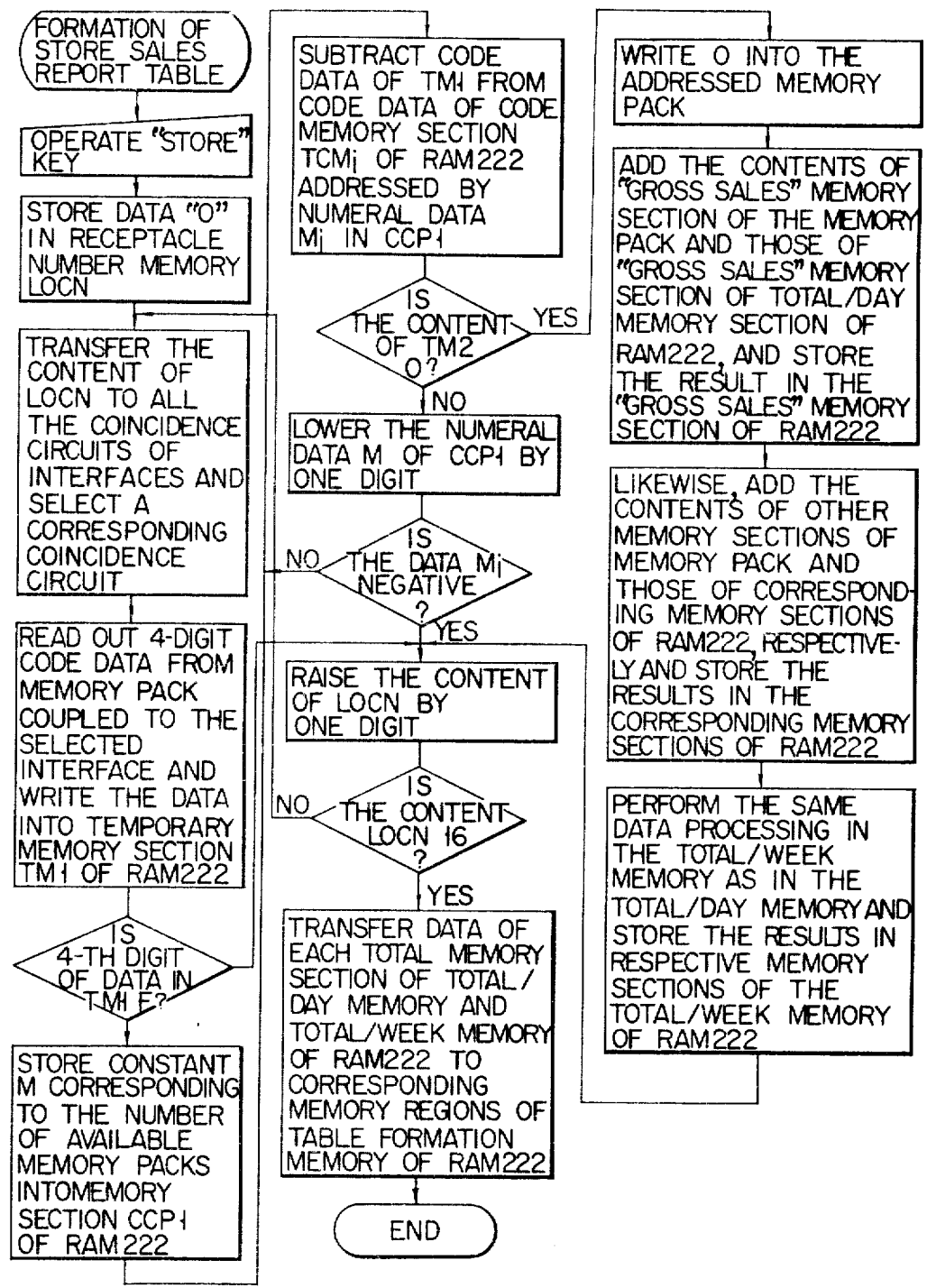
FIG. 21 is a flow chart of steps for preparing a store sales report.

By using the terminal memory pack 3 and the cashier memory pack 4 storing the sales information, a store sales report and a cashier sales report are prepared. FIG. 21 shows a flow chart for preparing the store sales report. The terminal memory packs 3 storing the sales information are inserted into the receptacles 20-1 to 20-16 of the SDP 2 and the STORE key in the report preparing terminal keys 21-3 is operated. Responsive to the operation of the STORE key, the CPU 220 detects that a flag is generated in the SIGN-ON memory area of the terminal memory pack, permits data "0" to be written into the receptacle number memory LOCN occupying a part of the RAM 222, supplies the contents of the LOCN to the coincidence detection circuits of all the interfaces 223 to 238, and selects the interface having the corresponding code, for example, the interface 223. Then, the CPU 220 reads out the terminal code of the terminal memory pack coupled with the interface 223. Thus, the preparation work for the store sales report is completed.

Then, the CPU 220 successively transfers the sales information stored in the terminal memory pack for each transaction such as cash or check transaction and for each department to the RAM 222. When the reading operation of the sales information from the terminal memory pack is completed, the CPU 220 stores "1" signal into the memory LOCN, selects, in accordance with the contents of the memory LOCN, the next interface, for example, the interface 224, reads out the sales information from the terminal memory pack coupled with the interface 224 as in the previous case, adds the read-out sales information to the sales information stored in the corresponding memory area of the RAM 222, and loads the result of the addition into the corresponding memory area of the RAM 222. Upon completion of the transfer of the sales information into the terminal memory pack, the gross sales for a day are loaded for each transaction and for each department into the store report memory area of RAM 222 as shown in FIG. 22, and then a store sales report for each transaction, for example, is prepared as shown in FIG. 23 based on the gross sales data stored.

Figure 24:
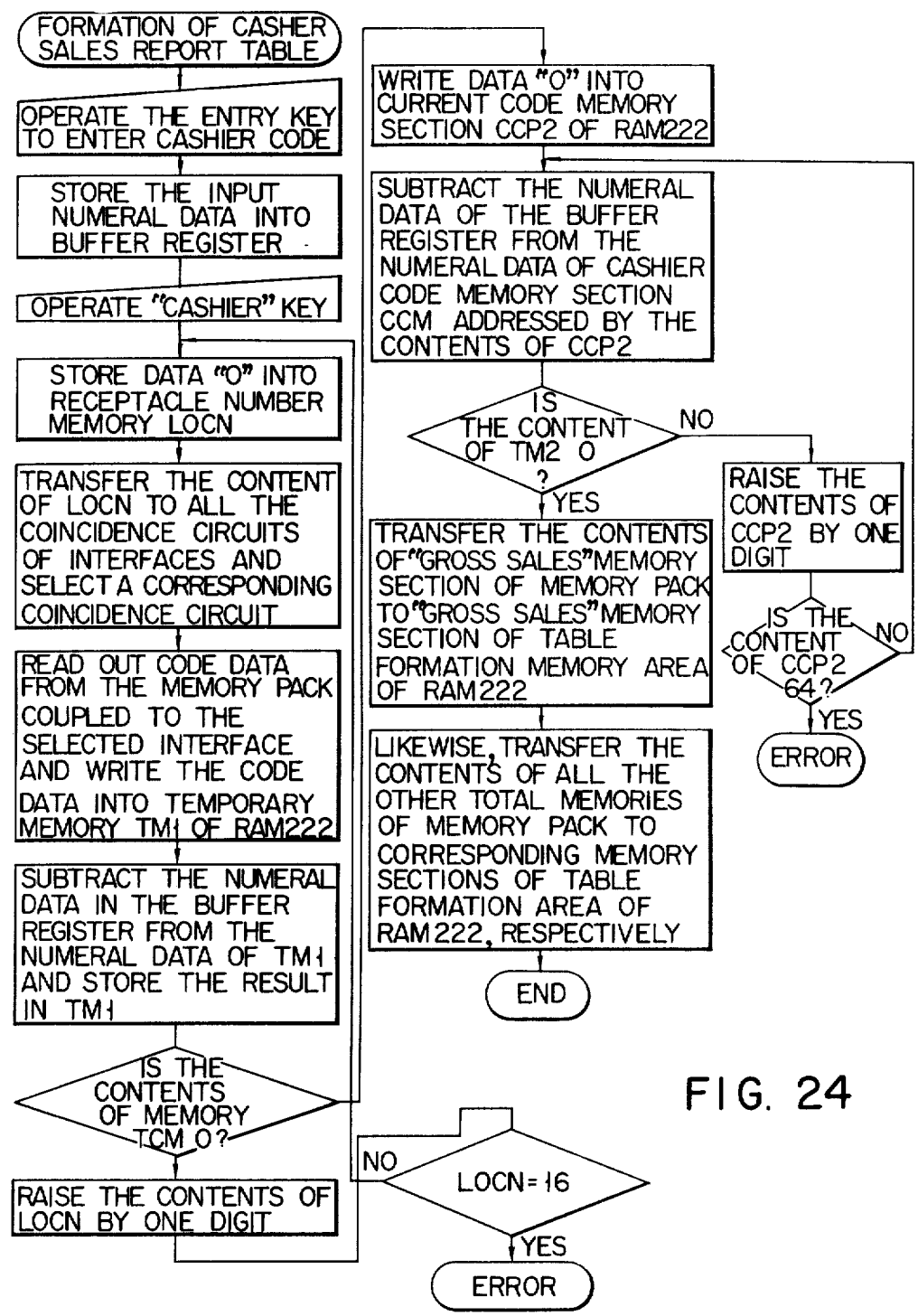
FIG. 24 is a flow chart for illustrating a process to prepare a cashier transaction report.

FIG. 24 shows a flow chart for illustrating the procedure to make out a cashier sales report. Cashier memory packs storing the sales information are inserted into the receptacles 20-1 to 20-16. After insertion, an entry key 21-1 is operated and the cashier code of the cashier memory pack is entered into the cashier code memory area of the RAM 222. Then, a CASHIER key of the report preparation keys 21-3 is operated, with the result that the CPU 220 successively transfer data signals "0" to "15" into the receptacle number memory location LOCN in the RAM 222 and at the same time feeds the respective data signals into all the interfaces 223 to 238 to detect the interface coupled with the cashier memory pack. Of course, also in this case, the CPU 220 checks to see whether a flag is generated in the SIGN-ON memory area of the cashier memory pack when the cashier code is written into the cashier code memory section or when the interface coupled with the cashier memory pack is detected.

Then, the CPU 220 successively transfers the sales amount information stored for each transaction from the cashier memory pack to the RAM 222. In this way, the sales amount information stored for each transaction is transferred to a given memory area of the RAM 222. As a consequence, a cashier sales report is formed as shown in FIG. 24.

Figure 26:
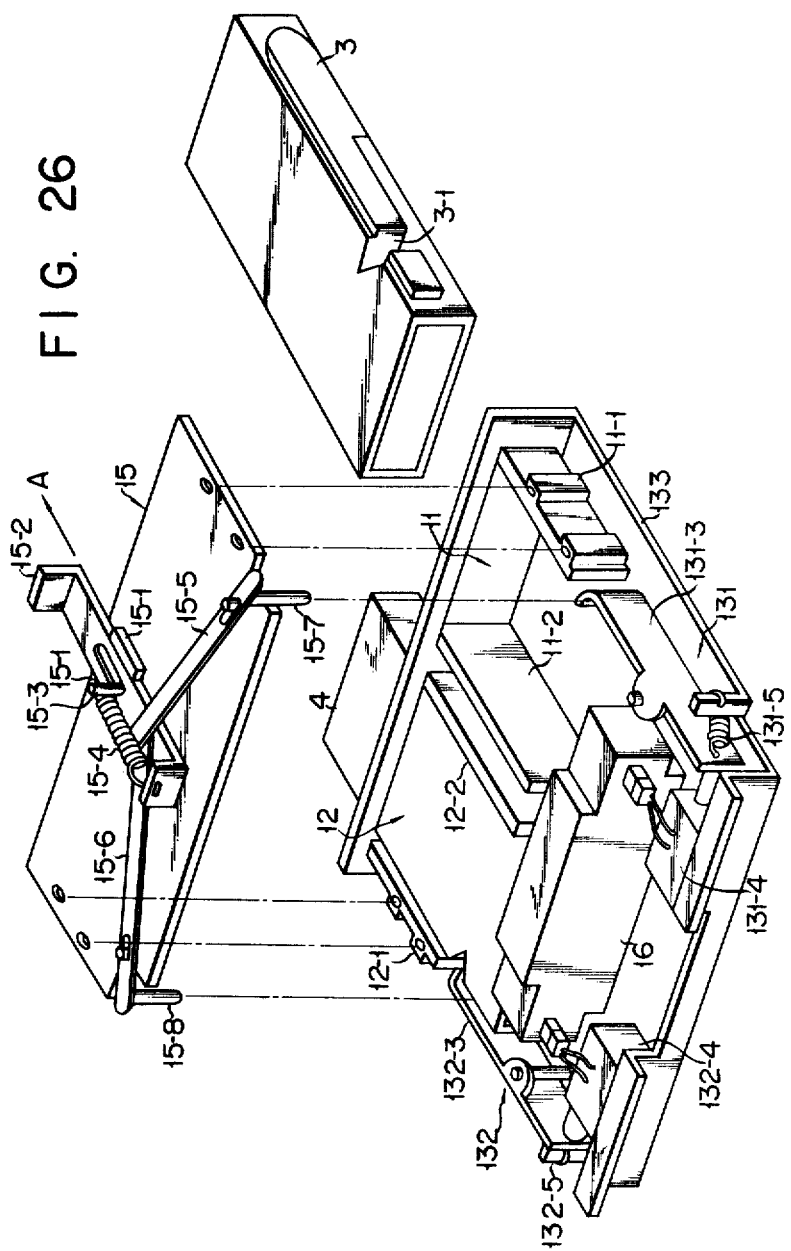
FIGS. 26 and 27 show a development and a plan view of a locking mechanism coupled with the interface circuit shown in FIG. 15.
Figure 27:
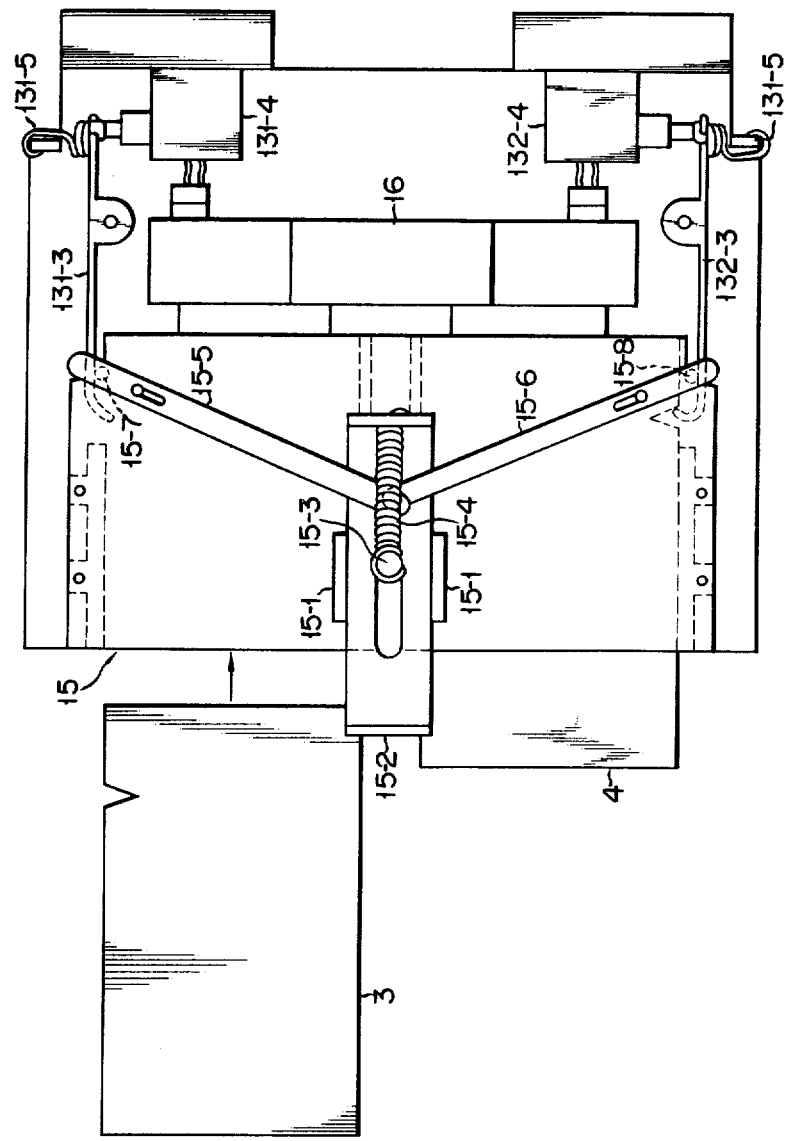

Reference is now made to FIGS. 26 and 27 to illustrate locking mechanism 131 and 132 for locking the terminal memory pack 3 and the cashier memory pack 4.

The lock mechanisms 131 and 132 are provided with arms 131-3 and 132-3 each of which has a hook at one end. These arms are pivotally mounted on a base plate 133 having receptacles for memory packs. A couple of arms 131-4 and 132-4 coupled with the other ends of the arms 131-3 and 132-3, when energized, drive the arms so that the hook ends of the arms are rotated toward the inside of the lock mechanisms. A couple of springs 131-5 and 132-5 also are attached to the other ends of the arms and bias the corresponding arms so as to move the hook ends of the arms toward the inside of the mechanisms. The receptacles 11 and 12 are formed by side walls 11-1 and 12-1 and partition walls 11-2 and 12-2, respectively. An upper plate 15 is mounted on the side walls 11-1 and 12-1. A drive lever 15-2 is slidable along a guide 15-1 on the upper plate 16. A spring 15-4 is disposed between a projection 15-3 projecting through a hole of the drive lever 15-2 from the upper plate 15 and the drive lever 15-2 and biases the drive lever 15-2 in a direction indicated by an arrow A. Two arms 15-5 and 15-6 are pivotally mounted at one end on the drive lever 15-2. These arms are provided with pins 15-7 and 15-8 contacting with the inside walls of the arms 131-3 and 132-3, respectively.

The solenoids 131-4 and 132-4 are coupled between the chip energizing terminals of the interfaces 123 and 124 and a power source +V housed in the interface case 16, respectively.

When a memory pack 3, for example, is inserted into a receptacle 11, the memory pack 3 is electrically coupled with the interface 123 and is held by the hook end of the arm 131-3 which is engaged with a notch 3-1 formed at the side wall of the memory pack 3. The engagment of the notch 3-1 with the hook end is released when the drive lever 15-2 is pushed in a direction opposite to the arrow direction A. That is, when the drive lever 15-2 is pushed, the arms 15-5 and 15-6 are expanded outwardly and thus the arms 131-1 and 132-1 are driven outwardly with the result that the engagement of the notch 3-1 with the arm 131-3 is released.

A given address signal is fed from the CPU 120 to the coincidence detection circuit 123-1 of the interface 123, and a data process initiating signal is fed from the CPU 120 to the D input terminal of the flip-flop circuit. Following this, the transistor 131-1 is rendered conductive so that the solenoid 131-4 is energized to ensure the engagement of the notch 3-1 the memory pack 3 with the hook end of the arm 131-1. Therefore, under this condition, the engagement is not released even if the drive lever 15-2 is pushed and hence it is prevented that the memory pack is erroneously pulled out when the contents of the memory pack 3 is being processed.

Locking mechanisms 245 to 260 used in the SDP 2 may be constructed similar to mechanisms 131 or 132 of FIG. 26.

While the invention is described by using a specific embodiment, it is not limited only to such an example. In the above embodiment, in order to ensure the locking of the memory pack, the solenoid is energized when the contents of the memory pack is under processing. Alternatively, the solenoid 131-2 may be deenergized when the contents of the memory pack is being processed. In this case, the locking state of the memory pack may be held by means of the spring 131-3, and released by energizing the solenoid 131-4 against the force of the spring 131-5. If the power is shut off due to power stoppage or the like and energization of the solenoid is impossible, the locking of the memory pack may manually be released by pushing the drive lever 15-2. In this case, the base terminal of the transistor 131-1 is connected to the Q̄ output terminal and not to the Q output terminal of the flip-flop circuit, for example.

The electronic cash register shown in FIG. 1 is provided with the memory pack receptacles 11 and 12. The ECR 1 may be constructed such that the information stored in the terminal memory pack is entered into the RAM of the ECR 1 and the receptacle 11 can be omitted. Additionally, a plurality of SDPs are used and desired information is written into a plurality of terminal memory packs by using one of the SDPs, and then the terminal memory pack with the same desired information loaded are used to enter the same information into the RAMs of the respective SDPs.

In the above embodiment, the terminal memory pack 3 and the cashier memory pack 4 are inserted into the receptacles 11 and 12, respectively, and the data is directly read out from the memory packs 3 and 4 and the transaction data is processed. However, the contents of the memory packs 3 and 4 are transferred to the RAM 122 and the transaction data may be processed on the basis of the data transferred into the RAM 122. In this case, after the terminal and cashier memory packs 3 and 4 are inserted into the receptacles 11 and 12, the entry key 13-1 is operated so as to write the cashier code of the cashier memory pack 4 into the RAM 122 and then the CSHR key is operated. Responsive to the operation of the CSHR key, the CPU 120 compares the cashier code recorded in the RAM 122 with the cashier code stored in the cashier memory pack 4 and at the same time compares the terminal code stored in the RAM 122 with the terminal code stored in the terminal memory pack 3. In this case, it is checked whether the SIGN-ON flag is generated in the SIGN-ON memory area of the terminal memory pack 3 or not. When coincidences between the terminal codes and between the cashier codes are detected and the SIGN-ON flag is generated, the CPU 120 transfers the data stored in the terminal and cashier memory packs 3 and 4 to the different memory areas of the RAM 122. Depending on the data transferred to the RAM 122, the CPU 120 executes data process. The transaction data thus processed is written into the RAM 122.

In this case, before the terminal of cashier memory pack is pulled out, given data in the transaction data stored in the RAM 122 must be transferred to the terminal and cashier memory packs 3 and 4. It is for this reason that, before the terminal or cashier memory pack is pulled out, the transfer key TR provided on the keyboard shown in FIG. 12 is operated. Responsive to the transfer key TR operation, the CPU 120 reads out the given transaction data from the RAM 122 and writes the same into the terminal and cashier memory pack 3 and 4.

What is claimed is:
1. An electronic cash register comprising:
a keyboard having a plurality of entry keys and at least one function key;
memory means;
a cashier memory pack;
a first interface circuit with which said cashier memory pack is mechanically, electrically and removably coupled; and
a data processing unit connected to said keyboard, said memory means and said first interface, and which is responsive to the operation of keys on said keyboard to write sales information into said memory means and to accumulatively write at least total sales data for each transaction in the sales information into said cashier memory pack coupled with said first interface circuit.

2. An electronic cash register according to claim 1, further comprising a terminal memory pack; and a second interface circuit into which said terminal memory pack is mechanically, electrically and removably coupled; and in which said data processing unit is coupled with said second interface circuit and writes for each transaction at least the total sales amount for each customer in the sales information generated in response to the key operation on said keyboard into the terminal memory pack electrically coupled with said second interface circuit.

3. An electronic cash register according to claim 2, further comprising alarm means; and in which said cashier memory pack and terminal memory pack store inherent cashier and terminal codes, respectively; and said keyboard further includes a cashier code key and a terminal code key which are operated together with said entry keys to enter cashier code information and terminal code information into said memory means; said data processing unit comparing a cashier code stored in the cashier memory pack coupled with said first interface with the cashier code information stored in said memory means and comparing a terminal code stored in the terminal memory pack coupled with said second interface circuit with terminal code information stored in said memory means, and issuing a code error signal to drive said alarm means when it is detected that both the cashier code of said cashier memory pack and the terminal code of said terminal memory pack are not coincident with the cashier code information and the terminal code information in said memory means.

4. An electronic cash register according to claim 2, further comprising a first lock mechanism for locking the cashier memory pack coupled with said first interface circuit; and a second lock mechanism for locking the terminal memory pack coupled with said second interface circuit; and in which said data processing unit generates a lock control signal when at least one of the keys on said keyboard is operated.

5. An electronic cash register according to claim 4, in which said first and second lock mechanisms each include engaging means, a spring for biasing said engaging means to be engaged with the memory pack coupled with said interface circuit and a solenoid which is responsive to said lock control signal to permit said engaging means to lock the memory pack to said engaging means.

6. An electronic cash register according to claim 4, in which said first and second lock mechanisms each include engaging means, a spring for biasing said engaging means to lock the memory pack and a solenoid which energizes said engaging means to release the locking state of said memory pack to said engaging means and is responsive to said lock control signal to be deenergized to release its force exerting onto said engaging means.

7. An electronic cash register according to claim 4, wherein said at least one function key of said keyboard includes a cashier code key and a terminal code key which are operated together with at least one of said entry keys to enter a cashier code and a terminal code into said memory means; said cashier memory pack and terminal memory pack store given cashier and terminal codes; and said data processing unit comparing the cashier code and the terminal code stored in said memory means with the corresponding ones stored in the cashier and terminal memory packs coupled with said first and second interface circuits and generating said locking control signal when these codes coincide to each other.

8. An electronic cash register according to claim 2, further comprising a cash tray removably received in the cash register.

9. An electronic cash register according to claim 2, in which said cashier memory pack and said terminal memory pack store given cashier and terminal codes, respectively; said keyboard includes a cashier code key and a terminal code key which are operated together with at least one of said entry keys to enter cashier code information and terminal code information into said memory means; and said data processing unit comparing the cashier code stored in the cashier memory pack coupled with said first interface circuit with the cashier code information stored in said memory means, comparing a terminal code in the terminal pack coupled with said second interface circuit with the terminal code information stored in said memory means, and reading out the information stored in the terminal memory pack and writing the same into said memory means when the cashier code stored in said cashier memory pack and the terminal code coincide with the cashier and terminal information stored in said memory means, respectively.

10. An electronic cash register according to claim 9, in which said data processing unit reads out the information from said cashier memory pack and writes the same into said memory means when the cashier code in the cashier memory pack and the terminal code in the terminal memory pack coincide with the cashier code and the terminal code information stored in said memory means.

11. An electronic cash register according to claim 10, in which said keyboard further includes a transfer key; and said data processing unit is responsive to the operation of said transfer key to transfer at least part of the sales information stored in said memory means to the terminal memory pack and the cashier memory pack.

12. An electronic cash register according to claim 1, further comprising alarm means; and in which said cashier memory pack stores a given cashier code; said keyboard further including a cashier code key which is operated together with at least one of said entry keys to enter the cashier code into said memory means; and said data processing unit comparing the cashier code of the cashier memory pack coupled with said first interface circuit with the cashier code in said memory means and generating an error signal to drive said alarm means when the cashier codes are not coincident with each other.

13. An electronic cash register according to claim 1, further comprising a lock mechanism coupled with said first interface circuit to lock said cashier memory pack; and said data processing unit producing a lock control signal to energize said lock mechanism when at least one of the keys on said keyboard is operated.

14. An electronic cash register according to claim 13, in which said lock mechanism includes engaging means, a spring for biasing said engaging means to be engaged with the cashier memory pack coupled with said first interface, and a solenoid for energizing said engaging means to lock the cashier memory pack to said engaging means in response to said lock control signal.

15. An electronic cash register according to claim 13, in which said lock mechanism includes engaging means, a spring for biasing said engaging means to lock said cashier memory pack and a solenoid which energizes said engaging means to release the locking state of said cashier memory pack with said engaging means and is responsive to said lock control signal to be deenergized to release the force exerting onto said engaging means.

16. An electronic cash register according to claim 13, in which the at least one function key of said keyboard includes a cashier code key which is operated together with said entry keys to load the cashier code into said memory means; said cashier memory pack including given cashier code; and said data processing unit comparing the cashier code stored in said memory means with the cashier code stored in the cashier memory pack coupled with said first interface circuit and producing said lock control signal when the cashier codes are coincident with each other.

17. An electronic cash register according to claim 1, further comprising a cash tray removably received in the cash register.

18. An electronic cash register system comprising:

a plurality of cashier memory packs a plurality of electronic cash registers each having a first keyboard including a plurality of first entry keys, and at least one first function key, first memory means, a first interface circuit with which at least one of the cashier memory packs is mechanically, electrically and removably coupled, and a first data processing unit coupled with said first keyboard, said first memory means and said first interface circuit, said first data processing unit being responsive to the operation of said first keyboard to write the sales information into said first memory means and accumulatively write at least total sales data for each transaction which is included in said sales information into the at least one cashier memory pack coupled with said first interface; and a data processor having a second keyboard including a plurality of entry keys and at least one second function key, a cashier code key and a cashier key, second memory means, a plurality of second interface circuits with which at least one of the cashier memory packs is mechanically, electrically and removably coupled, and a second data processing unit coupled with said second keyboard, said second memory means and said second interface circuits, said second data processing unit writing information produced by key operation on said second keyboard into said second memory means and the cashier memory packs coupled with said second interface circuits, selecting one of the cashier memory packs coupled with said second interface circuits in response to the operations of said entry keys and said cashier code key, and transferring the contents of the selected cashier memory pack to said second memory means.

19. An electronic cash register system according to claim 18, further comprising a plurality of terminal memory packs, and in which each of said electronic cash registers includes a third interface circuit coupled with said first data processing unit, with which at least one of the terminal memory packs is mechanically, electrically and removably coupled, said first data processing unit writing for each transaction at least the sales data for a customer in the sales information generated by key operation on said first keyboard into the at least one terminal memory pack coupled with said third interface circuit; said data processor further including a plurality of fourth interface circuits coupled with said second data processing unit, with which at least some of said terminal memory packs are mechanically, electrically and removably coupled; said second keyboard further includes a terminal code key and a terminal key; and said second data processing unit writes the key information produced by key operation on said second keyboard into the terminal memory packs coupled with said fourth interface circuits, selects one of the terminal memory packs coupled with said fourth interface circuits and transfers the contents of the selected terminal memory pack in response to the key operation of the terminal key into said second memory means.

20. An electronic cash register system according to claim 19, further comprising alarm means; and in which said cashier memory packs and terminal memory packs store inherent cashier and terminal codes, respectively; and said first keyboard further includes a cashier code key and a terminal code key which are operated together with said first entry keys to enter cashier code information and terminal code information into said first memory means; said first data processing unit comparing a cashier code stored in the at least one cashier memory pack coupled with said first interface circuit with the cashier code information stored in said memory means and comparing a terminal code stored in the at least one terminal memory pack coupled with said third interface circuit with terminal code information stored in said memory means, and issuing a code error signal to drive said alarm means when it is detected that the cashier code or terminal code of said at least one cashier memory pack or said at least one terminal memory pack is different from the cashier code information or the terminal code information in said first memory means.

21. An electronic cash register system according to claim 19, further comprising a first lock mechanism for locking the cashier memory pack coupled with said first interface circuit; and a second lock mechanism for locking the terminal memory pack coupled with said third interface circuit; and in which said first data processing unit generates a lock control signal when at least one of the keys on said keyboard is operated.

22. An electronic cash register system according to claim 21, in which said first and second lock mechanisms each include engaging means, a spring for biasing said engaging means to be engaged with the memory pack coupled with said interface circuit and a solenoid which is responsive to said lock control signal to permit said engaging means to lock the memory pack to said engaging means.

23. An electronic cash register system according to claim 21, in which said first and second lock mechanisms each include engaging means, a spring for biasing said engaging means to lock the memory pack and a solenoid which energizes said engaging means to release the locking state of said memory pack to said engaging means and is responsive to said lock control signal to be deenergized to release its force exerting onto said engaging means.

24. An electronic cash register system according to claim 21, wherein said at least one first function key on each of said first keyboards includes a first cashier code key and a first terminal code key which are operated together with at least one of said first entry keys to enter a cashier code and a terminal code into said first memory means; said at least one cashier memory pack and at least one terminal memory pack storing given cashier and terminal codes, respectively; and said first data processing unit comparing the cashier code and the terminal code stored in said first memory means with the corresponding ones stored in the cashier and terminal memory packs coupled with said first and third interface circuits and generating said locking control signal when these codes coincide to each other.

25. An electronic cash register system according to claim 19, wherein each of the cash registers further comprises a cash tray removably received therein.

26. An electronic cash register system according to claim 19, in which said at least one cashier memory pack and said at least one terminal memory pack store given cashier and terminal codes, respectively; said first keyboard including a cashier code key and a terminal code key which are operated together with at least one of said first entry keys to enter cashier code information and terminal code information into said first memory means; and said first data processing unit comparing the cashier code stored in the cashier memory pack coupled with said first interface circuit with the cashier code information stored in said first memory means, comparing a terminal code in the terminal pack coupled with said third interface circuit with the terminal code information stored in said first memory means, and reading out the information stored in the terminal memory pack and writing the same into said first memory means when the cashier code stored in said cashier memory pack and the terminal code coincide with the cashier and terminal information stored in said first memory means, respectively.

27. An electronic cash register system according to claim 26, in which said first data processing unit reads out the information from said cashier memory pack and writes the same into said first memory means, when the cashier code in the cashier memory pack and the terminal code in the terminal memory pack coincide with the cashier code and the terminal code information stored in said first memory means.

28. An electronic cash register system according to claim 27, in which said first keyboard further includes a transfer key; and said first data processing unit is responsive to the operation of said transfer key to transfer at least part of the sales information stored in said first memory means to the at least one terminal memory pack and the at least one cashier memory pack.

29. An electronic cash register system according to claim 18, further comprising alarm means; and in which said at least one cashier memory pack stores a given cashier code; said first keyboard further includes a cashier code key which is operated together with at least one of said first entry keys to enter the cashier code into said first memory means; and said first data processing unit comparing the cashier code of the cashier memory pack coupled with said first interface circuit with the cashier code in said first memory means and generating an error signal to drive said alarm means when both the cashier codes are not coincident with each other.

30. An electronic cash register system according to claim 18, further comprising a lock mechanism coupled with said first interface circuit to lock said at least one cashier memory pack; and said first data processing unit producing a lock control signal to energize said lock mechanism when at least one of the keys on said first keyboard is operated.

31. An electronic cash register system according to claim 30, in which said lock mechanism includes engaging means, a spring for biasing said engaging means to be engaged with the cashier memory pack coupled with said first interface, and a solenoid for energizing said engaging means to lock the cashier memory pack to said engaging means in response to said lock control signal.

32. An electronic cash register system according to claim 30, in which said lock mechanism includes engaging means, a spring for biasing said engaging means to lock said cashier memory pack, and a solenoid which energizes said engaging means to release the locking state of said cashier memory pack with said engaging means and is responsive to said lock control signal to be deenergized to release the force exerting onto said engaging means.

33. An electronic cash register system according to claim 30, in which said first function key of said first keyboard includes a cashier code key which is operated together with said first entry key to load a cashier code into said first memory means; said at least one cashier memory pack including a given cashier code; and said first data processing unit comparing the cashier code stored in said first memory means with the cashier code stored in the at least one cashier memory pack coupled with said first interface circuit and producing said lock control signal when the cashier codes are coincident with each other.

34. An electronic cash register system according to claim 32, in which each cash register further comprises a cash tray removably received therein.

* * * * *